(12) United States Patent
Yoon et al.

(10) Patent No.: US 12,374,492 B2
(45) Date of Patent: Jul. 29, 2025

(54) MULTILAYER ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Seok Hyun Yoon, Suwon-si (KR); In Ho Jeon, Suwon-si (KR); Yun Jung Park, Suwon-si (KR); Jin Woo Kim, Suwon-si (KR); Mi Yang Kim, Suwon-si (KR); Se Yoon Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 148 days.

(21) Appl. No.: 18/112,709

(22) Filed: Feb. 22, 2023

(65) Prior Publication Data

US 2024/0013978 A1 Jan. 11, 2024

(30) Foreign Application Priority Data

Jul. 5, 2022 (KR) .................... 10-2022-0082228

(51) Int. Cl.
*H01G 4/12* (2006.01)
*H01G 4/30* (2006.01)

(52) U.S. Cl.
CPC ............. *H01G 4/1227* (2013.01); *H01G 4/30* (2013.01)

(58) Field of Classification Search
CPC .......... H01G 4/1227; H01G 4/30; H01G 4/32
See application file for complete search history.

(56) References Cited

U.S. PATENT DOCUMENTS

| | | | |
|---|---|---|---|
| 2005/0152095 A1* | 7/2005 | Nakano ................ | H01G 4/1227 361/321.4 |
| 2005/0286207 A1* | 12/2005 | Ito ....................... | C04B 35/4682 361/321.2 |
| 2013/0083450 A1 | 4/2013 | Yoon et al. | |
| 2014/0301013 A1* | 10/2014 | Kim ....................... | H01G 4/01 29/25.03 |
| 2016/0172107 A1 | 6/2016 | Yoon et al. | |
| 2019/0148042 A1* | 5/2019 | Yun ..................... | H01G 4/1281 361/275.3 |

(Continued)

FOREIGN PATENT DOCUMENTS

| | | |
|---|---|---|
| JP | 2008-230928 A | 10/2008 |
| JP | 2013-79183 A | 5/2013 |

(Continued)

OTHER PUBLICATIONS

Japanese Office Action dated May 27, 2024 issued in Japanese Patent Application No. 2023-033601 (with English translation).

*Primary Examiner* — Michael P McFadden
(74) *Attorney, Agent, or Firm* — Morgan Lewis & Bockius LLP

(57) ABSTRACT

A multilayer electronic component includes a body including a dielectric layer and an internal electrode; and an external electrode disposed on the body, wherein the dielectric layer includes a plurality of dielectric grains, and wherein the plurality of dielectric grains include one or more first dielectric grains in which a sum of lengths of defects in a dielectric grain is 150 nm or more.

40 Claims, 9 Drawing Sheets

(56) References Cited

U.S. PATENT DOCUMENTS

2020/0258684 A1    8/2020  Yun et al.
2020/0411241 A1*  12/2020  Hashimoto .......... H01G 4/0085
2021/0155549 A1    5/2021  Nomura et al.

FOREIGN PATENT DOCUMENTS

| JP | 2021-9993 A | 1/2021 |
| JP | 2021-061335 A | 4/2021 |
| KR | 10-2016-0073243 A | 6/2016 |
| KR | 10-2020-0099059 A | 8/2020 |
| WO | 2019/198418 A1 | 10/2019 |

* cited by examiner

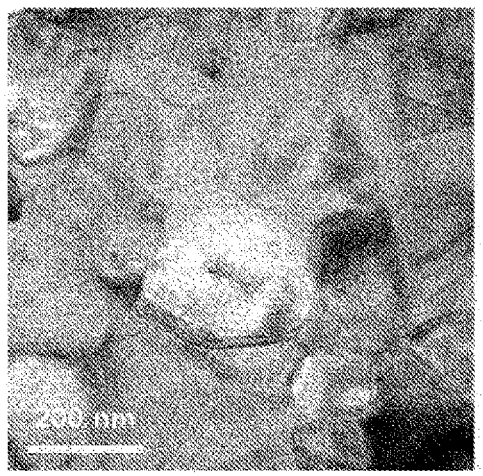 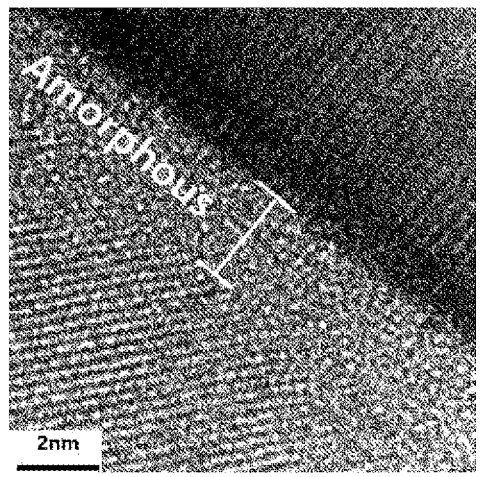
FIG. 7A  FIG. 7B
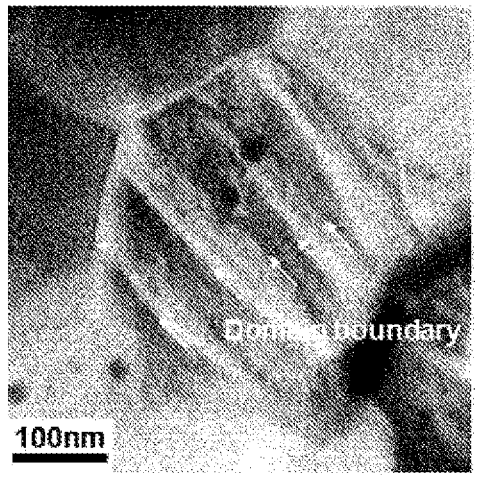 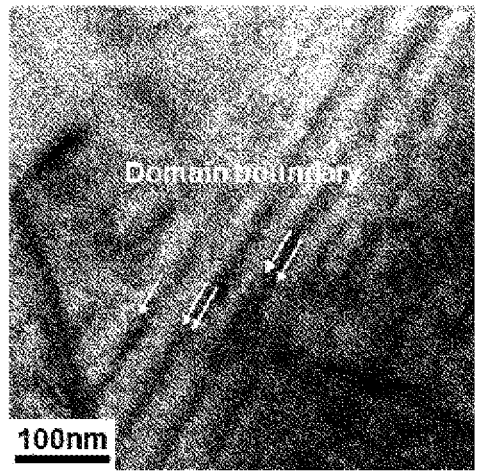
FIG. 8A  FIG. 8B

MULTILAYER ELECTRONIC COMPONENT AND METHOD OF MANUFACTURING THE SAME

CROSS-REFERENCE TO RELATED APPLICATION(S)

This application claims benefit of priority to Korean Patent Application No. 10-2022-0082228 filed on Jul. 5, 2022 in the Korean Intellectual Property Office, the disclosure of which is incorporated herein by reference in its entirety.

BACKGROUND

1. Technical Field

The present disclosure relates to a multilayer electronic component and a method of manufacturing the same.

2. Description of Related Art

A multilayer electronic component (MLCC), a multilayer electronic component, may be mounted on printed circuit boards of various electronic products such as image display devices such as a liquid crystal display (LCD) and a plasma display panel (PDP), a computer, a smartphone, and a mobile phone and may charge or discharge electricity.

Such a multilayer ceramic capacitor may be used as a component of various electronic devices. The multilayer ceramic capacitor may have a small size and high capacity and may be easily mounted. As various electronic devices such as computers and mobile devices have been designed to be miniaturized and to have high output, demand for miniaturization and high capacity of a multilayer ceramic capacitor has increased.

Also, as the market for MLCC for IT and also automobile applications has recently expanded, demand for products with high rated voltage and excellent reliability at the same capacity level has increased. Accordingly, attempts have been made to improve reliability by adding various additives to dielectric powder. However, even when the dielectric composition is the same, there may be a large difference in reliability depending on a microstructure, distribution and solubility of additive elements, and process conditions.

SUMMARY

Example embodiments of the present disclosure mat provide a multilayer electronic component having improved reliability.

Example embodiments of the present disclosure may provide a multilayer electronic component having an excellent room temperature dielectric constant, DC-bias properties and high-temperature withstand voltage properties, and a method of manufacturing the same.

Example embodiments of the present disclosure may provide a multilayer electronic component which may satisfy X7R or X7S capacity temperature properties and a method of manufacturing the same.

Example embodiments of the present disclosure may provide a multilayer electronic component having excellent reliability by creating defects in grains and a method of manufacturing the same.

Example embodiments of the present disclosure may provide a multilayer electronic component in which an Si element is present in a solid-solute state (present as a solute in a solid solution) in a grain boundary region formed in a dielectric crystal lattice and a method of manufacturing the same.

According to an example embodiment of the present disclosure, a multilayer electronic component includes a body including a dielectric layer and an internal electrode; and an external electrode disposed on the body, wherein the dielectric layer includes a plurality of dielectric grains, and wherein the plurality of dielectric grains include one or more first dielectric grains in which a sum of lengths of defects in one first dielectric grain is 150 nm or more.

According to an example embodiment of the present disclosure, a method of manufacturing a multilayer electronic component includes milling a dielectric composition including dielectric powder as a main component, a solvent, and a dispersant; preparing a slurry by adding a binder to the dielectric composition and conducting further milling; forming a ceramic green sheet using the slurry; forming a laminate by printing a conductive paste for an internal electrode on the ceramic green sheet and laminating; forming a body including a dielectric layer and an internal electrode by firing the laminate; and forming an external electrode on the body, wherein the milling of the dielectric composition is performed such that the dielectric layer includes one or more first dielectric grains in which a sum of lengths of defects in one first dielectric grain is 150 nm or more.

According to an example embodiment of the present disclosure, a multilayer electronic component includes a body including a dielectric layer and an internal electrode; and an external electrode disposed on the body, wherein the dielectric layer includes a plurality of dielectric grains including one or more first dielectric grains in which a sum of lengths of defects in one first dielectric grain is 150 nm or more, and the defects extend from the grain boundary toward the center of the one first dielectric grain.

According to an example embodiment of the present disclosure, a method of manufacturing a multilayer electronic component includes milling a dielectric composition for 4 hours or more, the dielectric composition including dielectric powder as a main component, a solvent, and a dispersant; preparing a slurry by adding a binder to the dielectric composition and conducting further milling; forming a ceramic green sheet using the slurry; forming a laminate by printing a conductive paste for an internal electrode on the ceramic green sheet and laminating; forming a body including a dielectric layer and an internal electrode by firing the laminate; and forming an external electrode on the body.

BRIEF DESCRIPTION OF DRAWINGS

The above and other aspects, features, and advantages of the present disclosure will be more clearly understood from the following detailed description, taken in combination with the accompanying drawings, in which:

FIG. 7A is a TEM image of a comparative example which does not include a dislocation in a dielectric grain;

FIG. 7B is a TEM image including an amorphous layer in a region adjacent to a grain boundary of a dielectric crystal lattice;

FIGS. 8A and 8B are each a TEM image in which a domain boundary is formed in a dielectric grain;

DETAILED DESCRIPTION

Figure 1:
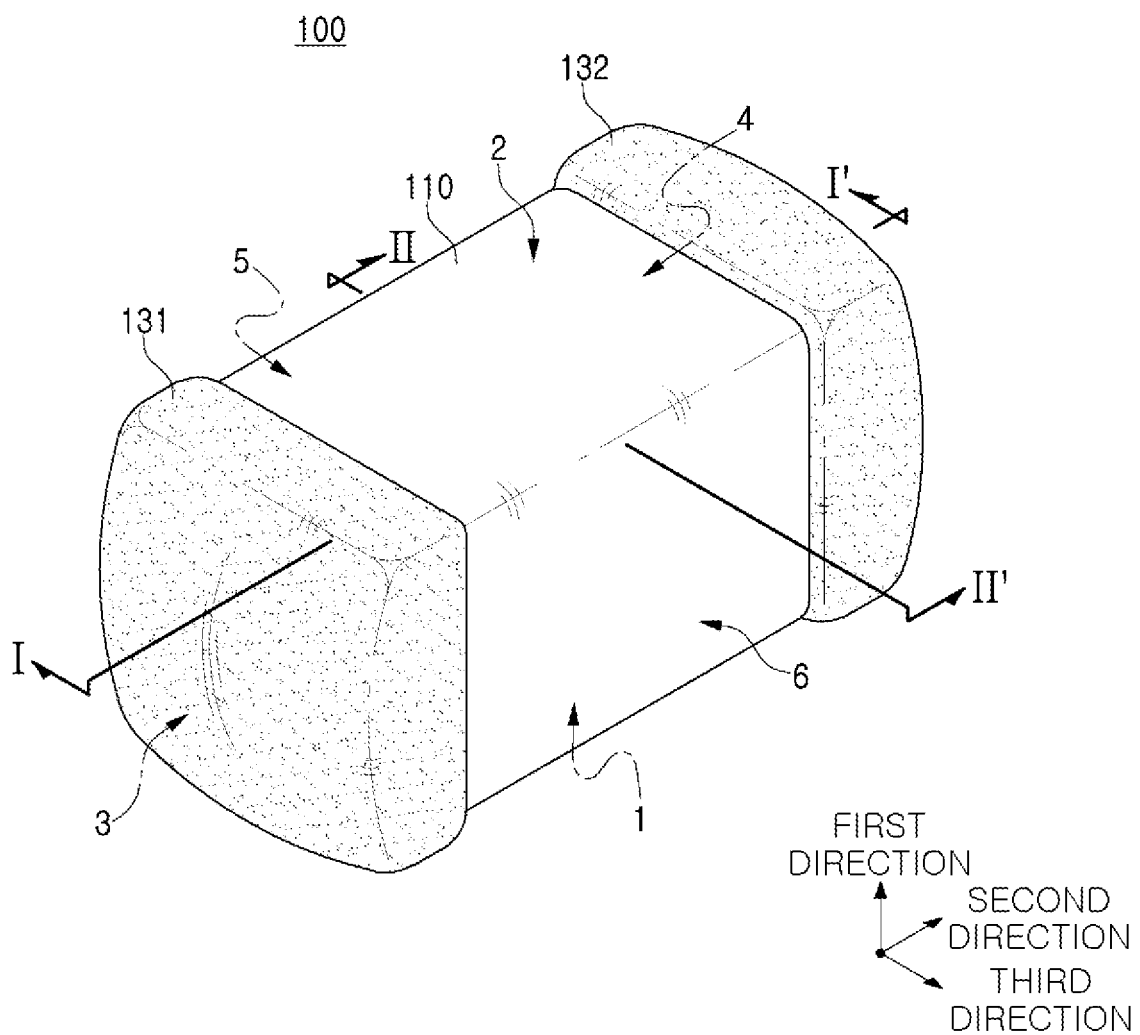
FIG. 1 is a perspective diagram illustrating a multilayer electronic component according to an example embodiment of the present disclosure.

Hereinafter, embodiments of the present disclosure will be described as below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application.

In the drawings, same elements will be indicated by same reference numerals. Also, redundant descriptions and detailed descriptions of known functions and elements which may unnecessarily make the gist of the present disclosure obscure will not be provided. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the drawings, a first direction may be defined as a lamination direction or a thickness T direction, a second direction may be defined as a length L direction, and a third direction may be defined as a width W direction.

Multilayer Electronic Component

FIG. 1 is a perspective diagram illustrating a multilayer electronic component according to an example embodiment.

Figure 2:
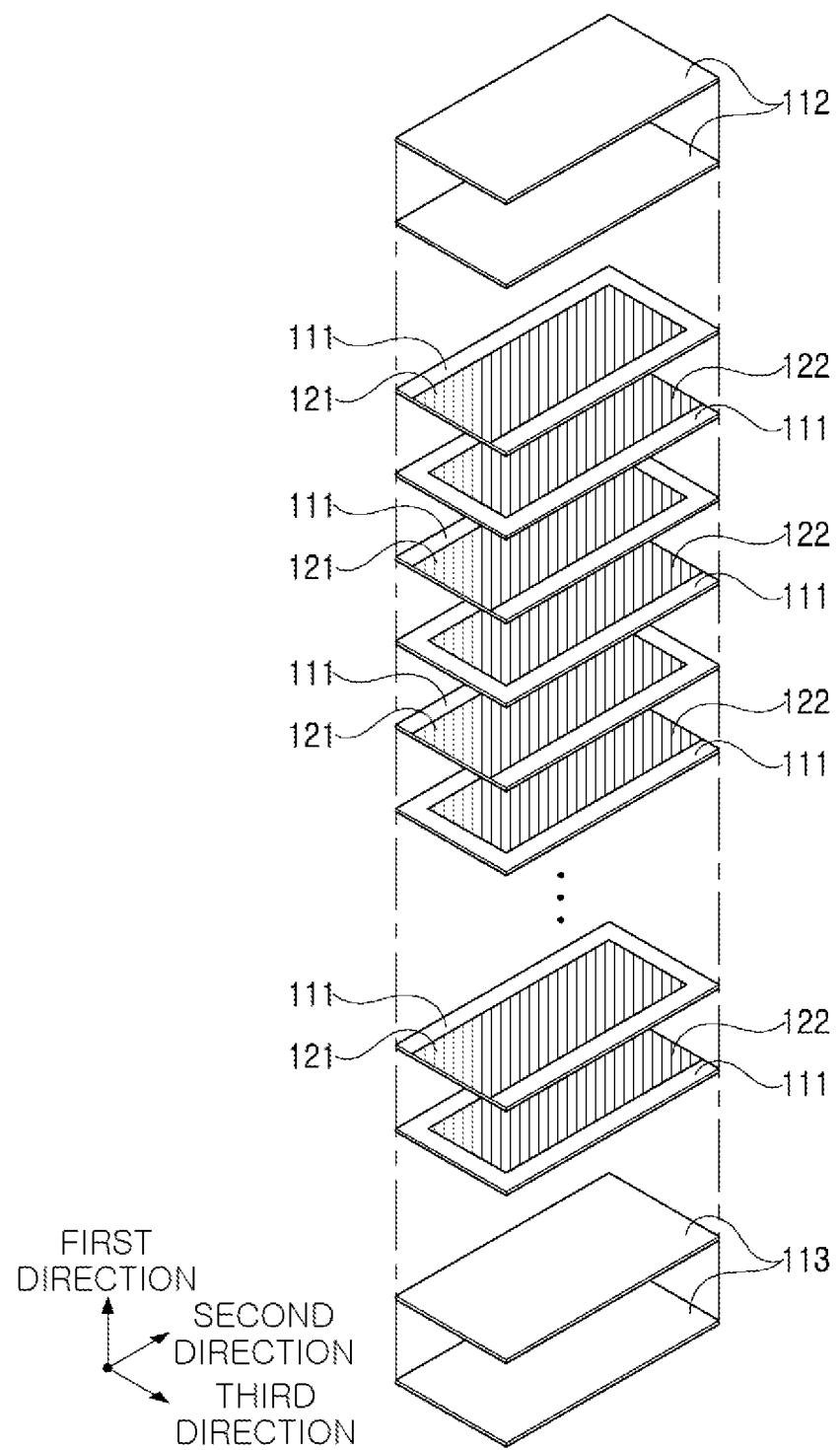
FIG. 2 is an exploded perspective diagram illustrating a multilayer electronic component according to an example embodiment of the present disclosure.

FIG. 2 is an exploded perspective diagram illustrating a multilayer electronic component according to an example embodiment.

Figure 3:
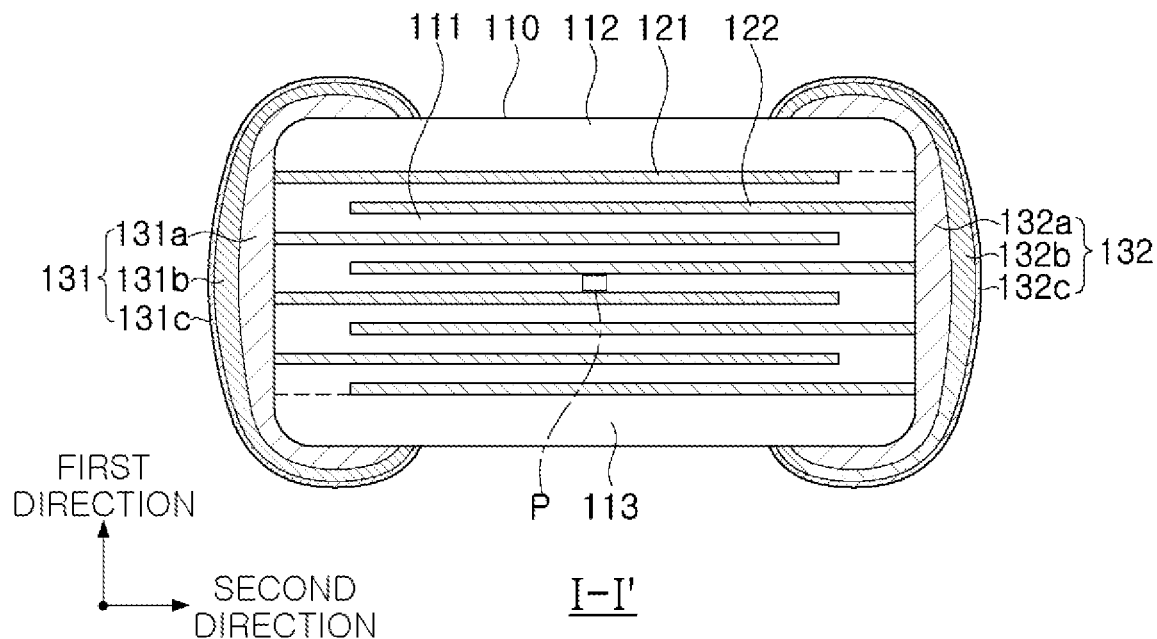
FIG. 3 is a cross-sectional diagram taken along line I-I' in FIG. 1.

FIG. 3 is a cross-sectional diagram taken along line I-I' in FIG. 1.

Figure 4:
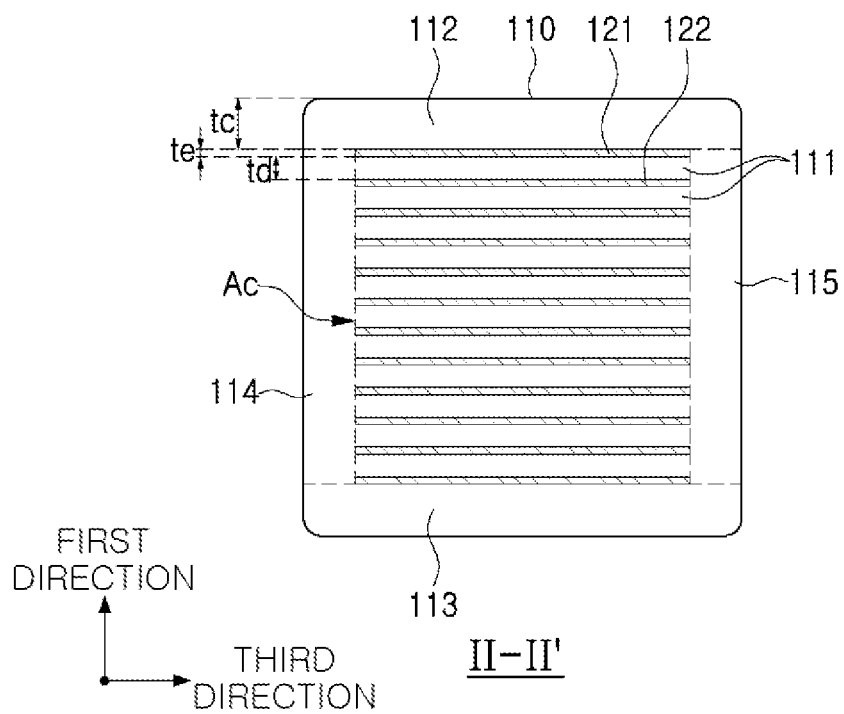
FIG. 4 is a cross-sectional diagram taken along line II-II' in FIG. 1.

FIG. 4 is a cross-sectional diagram taken along line II-II' in FIG. 1.

Figure 5:
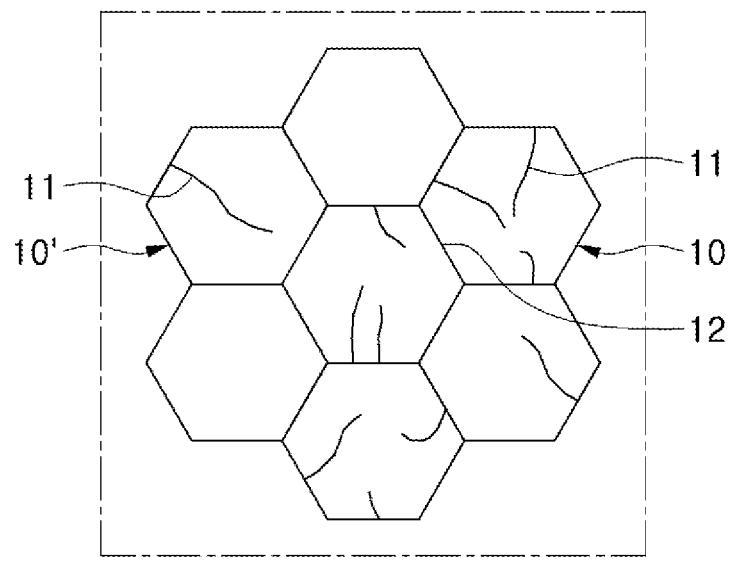
FIG. 5 is an enlarged diagram illustrating region P in FIG. 3.

FIG. 5 is an enlarged diagram illustrating region P in FIG. 3.

Figure 6A:
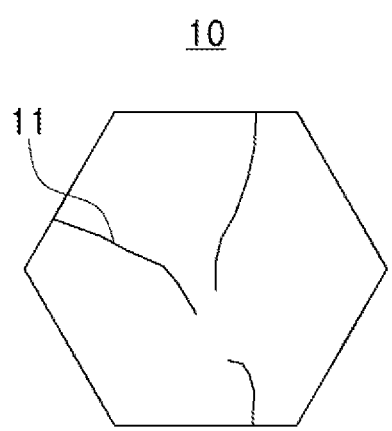
FIGS. 6A and 6B are each a diagram illustrating a dielectric grain including a dislocation.
Figure 6B:
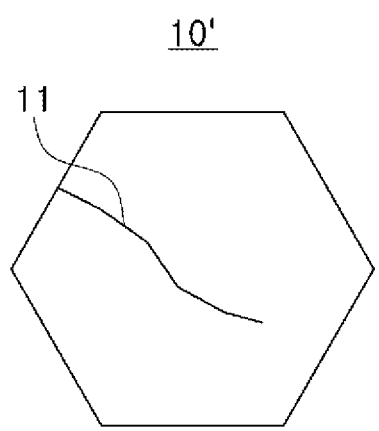

FIGS. 6A and 6B are each a diagram illustrating a dielectric grain including a dislocation.

Hereinafter, a multilayer electronic component according to an example embodiment will be described in greater detail with reference to FIGS. 1 to 6B. A multilayer ceramic capacitor will be described as an example of a multilayer electronic component, but the example embodiment may be applied to various electronic products using a dielectric composition, such as, for example, an inductor, a piezoelectric element, a varistor, or a thermistor.

A multilayer electronic component 100 according to an example embodiment may include a body 110 including a dielectric layer 111 and internal electrodes 121 and 122, and external electrodes 131 and 132 disposed on the body 110, and the dielectric layer 111 may include a plurality of dielectric grains, and the plurality of dielectric grains may include one or more first dielectric grains 10 and 10' in which the sum of lengths of defects in the dielectric grains is 150 nm or more.

In the body 110, the dielectric layer 111 and the internal electrodes 121 and 122 may be alternately laminated.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the body 110 may be in a fired state, and boundaries between adjacent dielectric layers 111 may be integrated with each other such that the boundaries may not be distinct without using a scanning electron microscope (SEM).

The body 110 may include an active portion Ac disposed in the body 110 and forming capacitance including the first internal electrode 121 and the second internal electrode 122 alternately disposed to oppose each other with a dielectric layer 111 interposed therebetween, and upper and lower cover portions 112 and 113 disposed on both end surfaces of the active portion Ac in the first direction, respectively, and may further include margin portions 114 and 115 disposed on both end surfaces of the active portion Ac in the third direction.

A raw material for forming the dielectric layer 111 is not limited to any particular example as long as sufficient capacitance may be obtained therewith. Generally, a perovskite ($ABO_3$)-based material may be used, and for example, a barium titanate material, a lead composite perovskite material, or a strontium titanate material may be used. The barium titanate material may include $BaTiO_3$ ceramic powder, and an example of the ceramic powder may include $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$) in which Ca (calcium), Zr (zirconium) are partially solid-solute. Ca (calcium) and Zr (zirconium) may be present as a solute in the $BaTiO_3$-based solid solution.

Also, various ceramic additives, organic solvents, binders, dispersants, or the like, may be added to a raw material for forming the dielectric layer 111 in the example embodiment to powder such as barium titanate ($BaTiO_3$).

Meanwhile, the dielectric layer 111 may include a dielectric composition to be described later, and more specifically, the dielectric layer 111 may be formed by sintering the dielectric composition.

Subcomponents included in the dielectric composition may be added as an additive in the form of an oxide or a carbonate, but after sintering the dielectric composition, the subcomponents may be present in the form of a solute in a $BaTiO_3$-based solid solution instead of being in the form of an oxide or a carbonate. A content ratio of main elements of the subcomponents may be maintained to be almost the same before and after sintering, and the content of each element of the dielectric layer 111 after sintering may be calculated based on the content of the main component and the subcomponents included in the dielectric composition before sintering.

Also, a quantitative content of each element included in the dielectric layer 111 may be measured using a destructive method.

Specifically, using the measurement method using the destructive method, the multilayer electronic component may be crushed, the internal electrode may be removed, and the dielectric portion may be selected, and components of the selected dielectric may be quantitatively analyzed using a device such as inductively coupled plasma-optical emission spectroscopy (ICP-OES) or inductively coupled plasma-mass spectrometry (ICP-MS).

Meanwhile, as the market for MLCC for automobile as well as MLCC for IT has been expanded, demand for products with a high rated voltage and excellent reliability at the same capacity level has increased. Generally, it is known that the smaller the grain size and the larger the grain boundary, the more the dielectric reliability may improve. Among MLCC dielectric composition additive elements, the effects of fixed valence acceptors, transition metal elements as variable valence acceptors, and rare earth elements on reliability have been well known, and generally, conditions with good reliability may be selected through optimization of the composition ratio of dielectric elements including the above-mentioned elements. While a base metal electrode (BME) MLCC has been industrialized, optimization of composition to improve reliability has been conducted. However, even with the same dielectric composition, there may be a significant difference in reliability depending on a microstructure, distribution and solid-solution of additive elements, and process conditions, and in addition to the compositional factor, by implementing a specific form in the dielectric microstructure, reliability may greatly improve.

The currently used high-capacity BME MLCC dielectrics such as X5R, X7R, X8R, and Y5V may be based on a sintered material obtained by co-doping a fixed valence acceptor such as Mg and Al and a rare earth element serving as a donor such as Y, Dy, Ho, and Er to a $BaTiO_3$ base material or a base material such as $(Ba,Ca)(Ti,Ca)O_3$, $(Ba,Ca)(Ti,Zr)O_3$ and $Ba(Ti,Zr)O_3$ in which Ca and Zr are partially solid-solute (present as a solute in a $BaTiO_3$-based solid solution), and additionally adding additives such as valence variable acceptors such as Mn, V, and Cr, extra Ba, and $SiO_2$ or sintering aids including the elements. In the case of firing in a reducing atmosphere, grain growth inhibition and reduction resistance may need to be implemented to realize normal capacity and insulating properties of high-capacity MLCC, and it is known that the above-described two effects may be realized by adding an appropriate amount of a fixed valence acceptor such as Mg. However, when only a fixed valence acceptor such as Mg is added, dielectric withstand voltage properties and reliability may be poor, and by adding a transition metal element, which is a variable valence acceptor such as Mn and V, and a rare earth element together, the effect of improving withstand voltage and reliability may be obtained. Most of these elements may be co-doped, and may be present as a solute in a shell region of the $BaTiO_3$ base material grains and may form a core-shell structure such that stable capacity properties and reliability according to the temperature of the MLCC. Accordingly, it may be expected that reliability may improve as these additive elements may be properly solid-solute (present as a solute) in the $BaTiO_3$ crystal lattice of the shell region, not being segregated while being included in a secondary phase.

In particular, among the additive elements, Si, which serves as a sintering aid, has an ionic radius of 0.4, which is relatively small as compared to 0.61, which is an ion radius of Ti of $BaTiO_3$ such that Si may not be solid-solute (present as a solute) in a BT lattice. Generally, Si may form a secondary phase after sintering by reacting with $BaTiO_3$.

However, according to an example embodiment, by disposing defects in the dielectric grains, diffusion of additive elements into the grains may be facilitated, thereby increasing reliability of the multilayer electronic component.

Also, in $BaTiO_3$, the solid-solution of the additive elements in the crystal lattice may occur by grain growth or lattice diffusion. When excessive grain growth occurs, additives may be properly solid-solute strengthened such that effective doping concentration may increase, but various issues such as temperature-capacity properties, DC-bias properties, and reliability may be deteriorated. Accordingly, it may be necessary to take measures to ensure proper additive dissolution while grain growth is suppressed.

Accordingly, according to an example embodiment, by disposing a defect in the dielectric grains, diffusion of additive elements may be facilitated or solid-solution of Si may be facilitated in the BT crystal lattice of the grain boundary region.

The multilayer electronic component 100 according to an example embodiment may include a plurality of dielectric grains in the dielectric layer 111, and the plurality of dielectric grains may include one or more first dielectric grains 10 and in which the sum of lengths of defects in the dielectric grains is 150 nm or more.

When the first dielectric grains 10 and 10' in which the sum of the lengths of the defects in the dielectric grains is 150 nm or more are not included, the effect of facilitating diffusion of the additive elements according to an example embodiment into the grains, and the effect of facilitating solid-solution of Si in the BT crystal lattice of the grain boundary region may be insufficient.

The measurement of the length of the defect may be performed by disassembling the multilayer electronic component, and observing the dielectric grains included in the dielectric layer using transmission electron microscope energy dispersive X-ray spectroscopy (TEM), and measuring the length of the defect included in the dielectric grains using a TEM device.

More specifically, the length may be obtained by measuring the length of the defect disposed in the dielectric grains from the image obtained by scanning in bright field or dark field image mode for a TEM sample fabricated using a focused ion beam (FIB), and a plurality of defects are included, the length may be obtained by summing the lengths of an entirety of defects measured by the above method. Other methods and/or tools appreciated by one of ordinary skill in the art, even if not described in the present disclosure, may also be used.

Meanwhile, in the example embodiment, a defect may include one or more of a line defect (one-dimensional) and a planar defect (two-dimensional).

Here, the line defect may refer to a crystal defect in the form of a line generated by misaligning atomic arrangement due to stress in a grain having the same crystal structure, and may also be referred to as dislocation.

A planar defect may refer to a twin plane or twin boundary, a domain boundary, or a grain boundary. The twin crystal may refer to a boundary surface which may have the same structure when rotated in the 180° direction with respect to the surface, and the twin crystal observed in the TEM image may appear in a substantially linear shape in a wider region. Also, referring to FIGS. 8A and 8B, a domain boundary may be observed in the dielectric grain, and when the domain boundary indicated by the arrow in FIGS. 8A and 8B is formed within the dielectric grain, a band shape having a constant thickness may be repeated as steps.

According to an example embodiment, the defect may be a dislocation. That is, the multilayer electronic component 100 according to an example embodiment may include a plurality of dielectric grains in the dielectric layer 111, and the plurality of dielectric grains may include one or more first dielectric grains 10 and 10' in which the sum of the lengths of dislocations within the dielectric grains is 150 nm or more.

When the defect is a dislocation, the effect of facilitating the diffusion of the additive elements according to an example embodiment into the grains and the effect of facilitating solid-solution of Si in the BT crystal lattice of the grain boundary region will be significantly improved. That is, to implement the effect of increasing reliability described in the example embodiments, the defect may preferably be a dislocation.

The hard milling arrangement conditions forming dislocations may activate the BT ($BaTiO_3$) particle surface and may facilitate a solid-solution reaction between BT and additives, and Si may be present as a solute in the BT crystal lattice of the grain boundary region, rather than being present as a secondary phase, such that reliability may further improve.

When the dislocations are present above a predetermined level in grains, reliability may greatly improve, and the surface of the $BaTiO_3$ base material powder may be activated in an environment in which dislocations are generated, such that the effect in which solid-solution of Si element may occur in the grain boundary region formed in $BaTiO_3$ crystal lattice, and in this case, reliability of the above-described multilayer electronic component may further improve.

As described above, a dislocation, a line defect, may be distinguished from a plane bond such as a twin crystal, a domain boundary, and a grain boundary, which is a planar defect, and a specific method of distinguishing a dislocation from a planar defect may be as below.

Figure 9A:
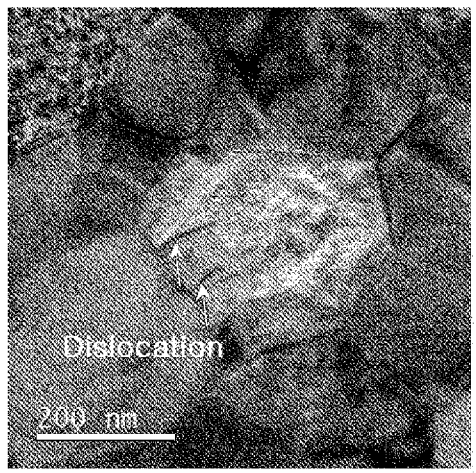
FIGS. 9A and 9B are each a TEM image of a dislocation formed in a dielectric grain.

In the case of a dislocation, which is a line defect, the brightness and darkness clearly distinct from the internal region of the grain, that is, for example, the shape of a black line of dark color in the grain indicated by the arrow in FIG. 9A may be a dislocation, and the grains including the dislocation indicated by the arrow may have a relatively bright white or gray color. In this case, it may be observed that the brightness and darkness colors of the grains may be substantially the same at points or in regions which may be symmetrical with respect to the dislocation. Meanwhile, the dislocation observed as a black line may be merely according to the observation environment, and is not always observed as a black color. The dislocation may be formed in a range in which the dislocation may be in contact with only a grain boundary and may not completely traverse a grain, or may have a shape in which the dislocation is not in contact with the grain boundary within a dielectric grain, rather than having the shape in which the dislocation is continuous from a grain boundary to another within a grain, Also, the dislocation may be generally observed in the form of a curved line or a line having a bent point rather than a perfect linear shape, but an example embodiment thereof is not limited thereto.

In the case of a grain boundary, which is a planar defect, the grain boundary may be similar to a dislocation in that the grain boundary has a dark black color surrounding the grain as illustrated in FIG. 9A, but the brightness and darkness colors may be substantially different between different grains at a point or region symmetrical with respect to the grain boundary. For example, the color of the grain including the dislocation indicated by the arrow in FIG. 9A may be relatively bright white or gray, whereas the colors of the other grains adjacent to the grain boundary surrounding the grain may be relatively dark gray or black color. Meanwhile, similarly to a dislocation, the grain boundaries do not appear as a dark black color.

In the case of the domain boundary, which is another planar defect, it may be observed that the brightness and darkness color may be substantially different from the example in FIGS. 8A and 8B at points or in regions symmetrical to each other with respect to the domain boundary. For example, it may be observed that, with respect to the domain boundary indicated by the arrow, a region having a relatively bright white constant area and a region having a relatively dark black or gray constant area may be alternately repeated like a step.

As such, the difference between the dislocation and the planar defect may be distinguished according to the presence or absence of a difference in brightness and darkness colors in a symmetrical region with respect the defect, or according to the thickness or shape of the defect, which may be because regions having substantially the same brightness and darkness may have the same crystal lattice direction of atoms, and because regions having different brightness and darkness may have different crystal lattice directions.

To sum up, a dislocation may be a linear defect in which the arrangement of atoms in a grain having a constant crystal structure is misaligned. As atoms in a grain other than a dislocation may have the same crystal direction, such that, when observing the microstructure, the same brightness and darkness may appear, but in the case of a planar defect, the regions adjacent to each other with respect to the planar defect, that is, for example, the regions adjacent to each other with respect to the grain boundary or domain boundary, may have different crystal lattice directions, such that, when observing the microstructure, substantially different brightness and darkness may appear.

Figure 9B:
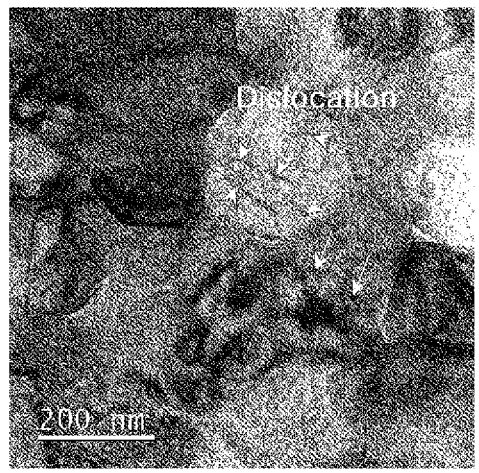

A more specific method for distinguishing line defects, dislocations and planar defects may be determined based on an image obtained by imaging with an Annular Bright Field-STEM (ABF-STEM) at a magnification of 40,000 times or more. Other methods and/or tools appreciated by one of ordinary skill in the art, even if not described in the present disclosure, may also be used. A domain boundary may be observed in the form of a band having a predetermined thickness repeating as a step, whereas a dislocation may appear as a single line which may have a thickness thinner than that of a planar defect or may have no thickness. For example, the image in each of FIGS. 9A and 9B is a microstructure image obtained under measurement conditions of an acceleration voltage of 200 kV, an OL aperture of 40 μm, a magnification of 40,000 times, and a bright field using the ARM 200F model of JEOL Corporation, and the objects appearing in a form of a line in the grains, indicated by the arrow, may be line defects. That is, the shape of the dislocation defect may be clearly distinct from other types of defects such as a twin plane, a domain boundary, and a grain boundary, which may be observed in a microstructure.

When the distinction is not clear even using the above-described method, the crystal lattice arrangement of atoms may be observed in a high magnification device for observing the crystal lattice arrangement of atoms, such as, for example, High Resolution TEM (HRTEM), and whether presence or absence of a line defect or a planar defect may be determined based on the properties of each defect generally defined or described above. Meanwhile, as for the measurement of the length of the dislocation, the aforementioned method of measuring the length of the defect may be used.

Specifically, a dislocation may be selected using a method of distinguishing the planar defect from the line defect described above from the defects disposed within dielectric grains in the image obtained by scanning in bright field or dark field imaging mode with respect to TEM samples fabricated using a focused ion beam (FIB), and a length of the dislocation may be measured. When a plurality of dislocations are present, the length may be obtained by summing the lengths of an entirety of dislocations measured by the above method.

Hereinafter, in relation to the defect, a dislocation, which is a line defect, will be described as an example, but an example embodiment thereof is not limited thereto, and the example in which, as defects other than the dislocation may be formed in the dielectric grains, the effect of facilitating the diffusion of the additive elements into the grains according to the example embodiment and the effect of facilitating solid-solution of Si in the BT crystal lattice of the grain boundary region may be secured may be included.

In an example embodiment, referring to FIGS. 5 and 6A and 6B, the first dielectric grains 10 and 10' in which the sum of the lengths of the dislocations 11 are 150 nm or more may refer to a first dielectric grain 10' in which the length of a dislocation 11 is 150 nm or more, or may refer to a first dielectric grain 10 in which the sum of the lengths of two or more dislocations 11 is 150 nm or more. As described above, the shape or number of dislocations 11 are not limited to any particular examples, and when the length of one dislocation 11 or the sum of the lengths of two or more dislocations 11 is 150 nm or more, the effect of increasing reliability may be realized.

That is, when one or more of the first dielectric grains 10 and 10' in which the sum of the lengths of the dislocations 11 in the dielectric grains is 150 nm or more among the plurality of dielectric grains are included, reliability of the multilayer electronic component may increase, and also, the solid-solution of the BT lattice of Si, which is an additive, may be facilitated, such that reliability may be further increased.

In this case, as the sum of the lengths of the dislocations 11 in the dielectric grain increases, reliability may tend to increase.

When the sum of the lengths of dislocations 11 in dielectric grains is less than 150 nm, it may be difficult to sufficiently implement target reliability and also, as the solid-solution of Si in the grain boundary region may not be smooth, such that it may be difficult to further realize target reliability.

In the example embodiment, one or more first grain boundary 12 having an Si content of 3.0 at % or more within 2 nm in a direction perpendicular to the grain boundary from the center in the direction perpendicular to the grain boundary may be included.

When the Si is present in an amount of less than 3.0 at % within 2 nm in a direction perpendicular to the grain boundary, it may be difficult to realize the effect of increasing reliability by adding Si.

Here, the grain boundary may refer to a boundary between two grains in contact with each other, and a boundary between two grains in contact with each other may be configured as a single grain boundary. That is, a grain may have as many grain boundaries as the number of grains in contact with each other. Referring to FIG. 5, as the grains disposed in the center are in contact with the six grains, the grains may have six grain boundaries. In this case, when one of the six grain boundaries has an Si content of 3.0 at % or more within 2 nm in a direction perpendicular to the grain boundary, the grain may include a single first grain boundary 12. The Si content may be determined by STEM-EDS. Other methods and/or tools appreciated by one of ordinary skill in the art, even if not described in the present disclosure, may also be used.

In an example embodiment, the first grain boundary 12 may have a perovskite ($ABO_3$) structure.

Materials having a perovskite structure may include, for example, a BT ($BaTiO_3$)-based dielectric material, and may include a material in which Ba or Ti site is substituted with another element, but an example embodiment thereof is not limited thereto.

In an example embodiment, at least a portion of Si may be solid-solute (present as a solute) in the perovskite structure.

As described above, Si may have an ionic radius smaller than that of Ti such that Si may be difficult to be solid-solute (present as a solute) in a BT lattice having a perovskite structure. However, when one or more dielectric grains 10 and 10' in which the sum of the lengths of dislocations 11 in the dielectric grains is 150 nm or more is included, Si may be solid-solute (present as a solute) in a grain boundary having a perovskite structure rather than being precipitated as a secondary phase. Since Si, which is an additive, is solid-solute (present as a solute) in a grain boundary having a perovskite structure, the effect of increasing reliability may be easily realized.

Meanwhile, in an example embodiment, the first grain boundary 12 may be a grain boundary of the first dielectric grains 10 and 10'.

That is, the Si content may be 3.0 at % or more within 2 nm in a direction perpendicular to the grain boundary in the center in a direction perpendicular to the grain boundary of the first dielectric grains 10 and 10' in which the sum of the lengths of the dislocations 11 in the dielectric grains is 150 nm or more.

However, an example embodiment thereof is not limited thereto, and when a dielectric grain in which the sum of the lengths of the dislocations 11 is less than 150 nm is referred to as a second dielectric grain, the grain boundary between the two second dielectric grains in contact with each other may also include the first grain boundary 12 having an Si content of 3.0 at % or more within 2 nm in the vertical direction.

That is, in the dielectric layer 111 including a plurality of dielectric grains, one or more arbitrary first dielectric grains 10 and 10' in which the sum of the lengths of the dislocations 11 is 150 nm or more are included in an arbitrary dielectric grain among the plurality of dielectric grains, Si may be solid-solute (present as a solute) at the grain boundaries of the first dielectric grains 10 and 10', or Si may be solid-solute (present as a solute) in the grain boundary of arbitrary second dielectric grain in which the sum of the lengths of dislocations 11 in the dielectric grain is less than 150 nm, and accordingly, such that the effect of increasing reliability may be realized.

Meanwhile, the upper limit of the sum of the lengths of the dislocations 11 in the first dielectric grains 10 and 10' may not be limited to any particular example, but may be less than 843 nm as a preferable example. That is, in an example embodiment, the sum of the lengths of the dislocations 11 in the first dielectric grains 10 and 10' may be 150 nm or more and less than 843 nm.

When the sum of the lengths of the dislocations 11 is less than 150 nm, it may be difficult to sufficiently realize the effect of increasing reliability as described above, and when the sum of the lengths of the dislocations 11 is 843 nm or more, dislocations may be excessively formed such that more than 3.0 at % of Si may be solid-solute (present as a solute) in the BT lattice, which may increase reliability, but the dielectric constant may be lowered.

That is, to satisfy the sum of the lengths of the dislocations 11 within a range in which the dielectric constant does not decrease to be lower the target dielectric constant, it may be desirable to control the sum of the lengths of the dislocations 11 to be less than 843 nm, but an example embodiment thereof is not limited thereto, and to increase reliability, the sum of the lengths of the dislocations 11 may be 843 nm or more.

Meanwhile, the dielectric layer 111 may include one or more first dielectric grains 10 and 10' in which the sum of the lengths of the dislocations 11 is 150 nm or more in a 2μ×2 μm region.

The above configuration may indicate that, when the internal region of the dielectric layer 111 is observed using measuring equipment, the first dielectric grains 10 and 10' in which the sum of the lengths of the dislocations 11 in an arbitrary 2μ×2 μm region is 150 nm or more may be present.

More specifically, in the length and thickness direction (L-T) cross-section of the body 110, 10 regions having a size of 2μ×2 μmare randomly designated in the dielectric layer 111 disposed on the active portion Ac and are observed using an electron microscope (TEM), and one or more first dielectric grains 10 and 10' are observed in an entirety of 10 regions, it may be indicated that one or more first dielectric grains 10 and 10' having the sum of the lengths of the dislocations 11 150 nm or more may be included in the 2μ×2 μm region.

In this case, one or more first grain boundaries 12 having an Si content of 3.0 at % or more may be included within 2 nm in a direction perpendicular to the grain boundary in the center of the grain boundary within the arbitrary 2μ×2 μm region.

More specifically, an example embodiment will be described with reference to FIGS. 9A to 11C as below.

First, FIGS. 9A and 9B are transmission electron microscope (TEM) images in which the sum of the lengths of dislocations formed in dielectric grains satisfy 150 nm or more.

The portion indicated by the arrow in FIGS. 9A and 9B may be a dislocation, and may exhibit the tendency in which dislocations are formed in the dielectric grains and reliability may increase as the sum of the lengths increases, and when the sum of the lengths of the dislocations is 150 nm, the effect of increasing reliability may be obtained. Specific examples and effects in which reliability is evaluated by varying the sum of the lengths of dislocations will be described later.

Figure 10A:
FIG. 10A is a TEM image of an example embodiment including a dislocation in a dielectric grain.
Figure 10B:
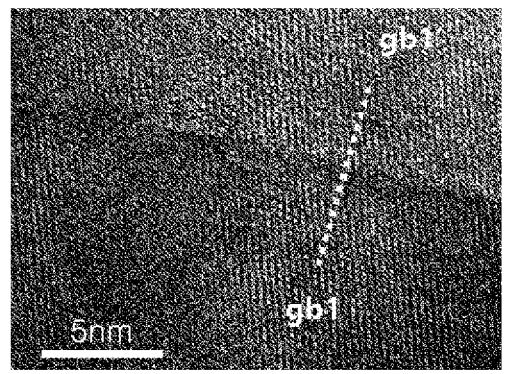
FIG. 10B is a HRTEM image of a grain boundary of a dielectric crystal lattice.
Figure 10C:
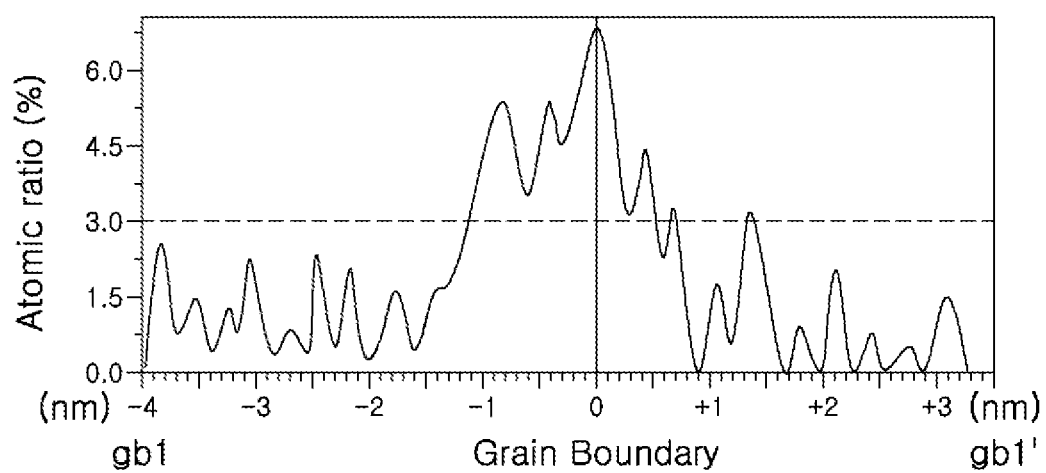
FIG. 10C is a STEM-EDS analysis graph for Si element content (at %) at the dotted line gb1-gb1' in FIG. 10B.

Meanwhile, referring to FIG. 10, which is an example embodiment, FIG. 10A is a TEM image in which dislocations are formed in the first dielectric grains 10 and 10', FIG. 10B is a High Resolution TEM (HRTEM) image in which a region on which a line-profiled is performed is indicated as a linear line to measure the Si element content (at %) in the direction perpendicular to the first grain boundary 12 of the second dielectric grains adjacent to the first dielectric grains 10 and 10' and including no dislocations, and FIG. 10C is a graph of a line-profile for the content (at %) of Si element in the dotted line in FIG. 10B, analyzed using a scanning transmission electron microscope-energy dispersive X-ray spectroscopy (STEM-EDS). As for the x-axis, the left (gb1) may be represented as "−distance" and the right (gb1') as "+distance" with respect to the first grain boundary 12 as the reference point, and the y-axis may represent the content (at %) of the Si element based on the total of (Ba+Ti+Si+RE) elements by distance with respect to the first grain boundary 12, that is, the Si element content is expressed in atomic percent (at %) based on the total number of atoms of Ba, Ti, Si and RE being 100 at %. Here, RE may refer to rare earth elements including one or more of Y, Dy, Ho, Er, Gd, Ce, Nd, Sm, Tb, Tm, La, Gd and Yb. Referring to FIG. 10C, it may be confirmed that a peak in which a percentage of Si element within ±2 nm with respect to the first grain boundary 12 (0 nm point) is 3.0 at % or more. Also, referring to FIG. 10B, it is indicated that an amorphous layer or a secondary phase as illustrated in FIG. 7B is not formed around the first grain boundary 12, such that the main component base material (BaTiO$_3$) maintained the perovskite crystal lattice, and accordingly, Si detected at the first grain boundary 12 may be present in a solid-solute state (as a solute in the solid solution).

Figure 11A:
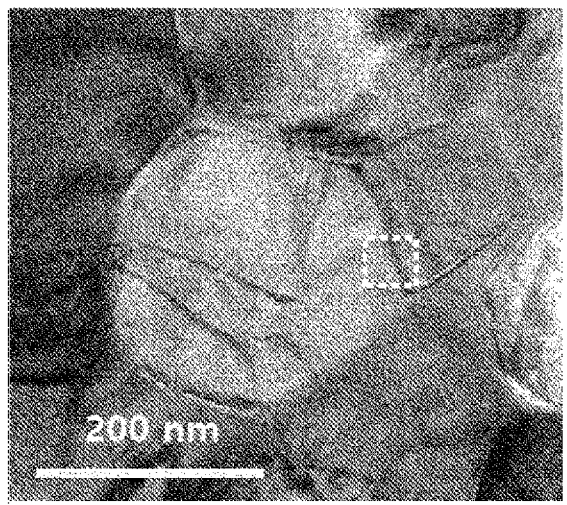
FIG. 11A is a TEM image of another example embodiment including a dislocation in a dielectric grain.
Figure 11B:
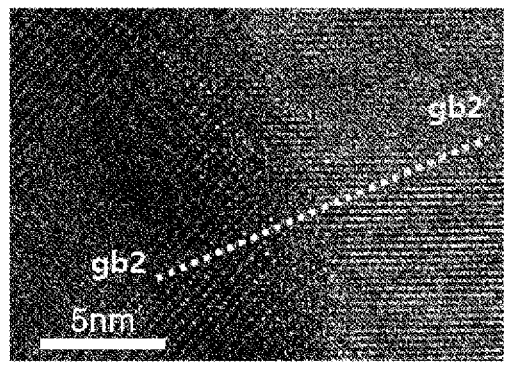
FIG. 11B is an HRTEM image of a grain boundary of a dielectric crystal lattice.
Figure 11C:
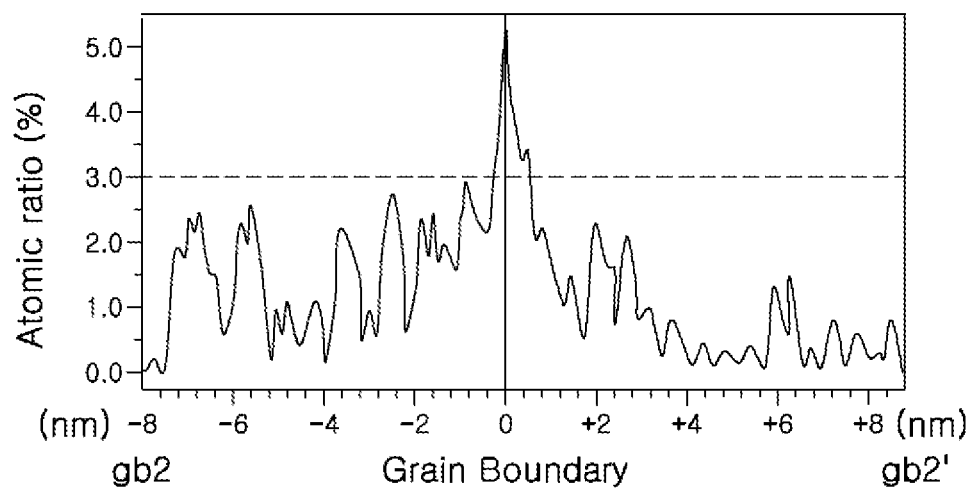
FIG. 11C is a STEM-EDS analysis graph for Si element content (at %) at the dotted line gb2-gb2' in FIG. 11B.

Referring to FIG. 11, which is another example embodiment, FIG. 11A is a TEM image in which the sum of the lengths of dislocations is formed to be 150 nm or more in a grain, and FIG. 11B may be a HRTEM image in which the region on which a line-profile is performed is indicated by a dotted line to measure the Si element content (at %) in the direction perpendicular to the first grain boundary 12 of the first dielectric grains 10 and 10' in which the sum of the lengths of dislocations is 150 nm or more, and FIG. 11C is a graph of a line-profile for the content (at %) of the Si element on the dotted line in FIG. 11B, analyzed by STEM-EDS. As for the x-axis, the left (gb2) represents as "−direction" and the right (gb2') as "+distance" with respect to the first grain boundary 12 as a reference point, and the y-axis represents the content (at %) of the Si element based on the total number of (Ba+Ti+Si+RE) elements by distance based on the first grain boundary 12. That is, the y-axis represents the Si element content, which is expressed in atomic percent (at %) based on the total number of atoms of Ba, Ti, Si, and RE being 100 at %. Referring to FIG. 11C, it may be confirmed that a peak having a Si element percentage of 3.0 at % or more are present within ±2 nm of the first grain boundary 12 (0 nm point). Also, referring to FIG. 11B, as in FIG. 10B, it is indicated that an amorphous layer or a secondary phase as in FIG. 7B was not formed around the first grain boundary 12, such that the main component base material (BaTiO$_3$) maintained the perovskite crystal lattice, and accordingly, Si detected at the first grain boundary 12 was present in a solid-solution state (as a solute in a solid solution).

Hereinafter, subcomponents which may be included in the above-described dielectric composition will be described in greater detail.

a) First Subcomponent

According to an example embodiment, the dielectric composition may further include a first subcomponent including one or more of an oxide or a carbonate of a variable valence acceptor element, wherein the variable valence acceptor element may include one or more of Mn, V, Cr, Fe, Ni Co, Cn, and Zn, and the content of the variable valence acceptor element included in the first subcomponent may be 0.2 mol or more and 1.4 mol or less based on 100 mol of the main component.

The variable valence acceptor element included in the first subcomponent may serve to decrease the firing temperature and to improve high-temperature withstand voltage properties of the multilayer ceramic capacitor to which the dielectric composition is applied.

When the content of the variable valence acceptor element included in the first subcomponent is less than 0.2 mol based on 100 mol of the main component, the high-temperature withstand voltage properties may be deteriorated, and when the content exceeds 1.4 mol based on 100 mol of the main component, the resistance-capacitance (RC) value may be deteriorated.

The content of the first subcomponent may be based on the content of one or more of Mn, V, Cr, Fe, Ni, Co, Cu, and Zn included in the first subcomponent without distinguishing an additive form such as oxide or carbonate. When two or more valence-variable acceptor elements are included, the first subcomponent may be based on the total content.

b) Second Subcomponent

According to an example embodiment, the dielectric composition further may include a second subcomponent including one or more of an oxide or a carbonate of Mg, and the content of the Mg element included in the second subcomponent may be 2.0 mol or less based on 100 mol of the main component.

Mg of the second subcomponent may serve to increase the RC value. However, when the content of the element Mg exceeds 2.0 mol based on 100 mol of the main component, high-temperature withstand voltage properties may be deteriorated.

c) Third Subcomponent

According to an example embodiment, the dielectric composition may further include a third subcomponent including one or more of an oxide and a carbonate of a rare earth element, wherein the rare earth element may include at least one of Y, Dy, Ho, Er, Gd, Ce, Nd, Sm, Tb, Tm, La, Gd and Yb, and the content of the rare earth element included in the third subcomponent may be 0.6 mol or more and 3.0 mol or less based on 100 mol of the main component.

The rare earth element included in the third subcomponent may serve to improve high-temperature withstand voltage properties. When the content of the rare earth element is less than 0.6 mol or more than 3.0 mol based on 100 mol of the main component, the high-temperature withstand voltage properties may be deteriorated.

The content of the third subcomponent may be based on at least one of Y, Dy, Ho, Er, Gd, Ce, Nd, Sm, Tb, Tm, La, Gd and Yb included in the third subcomponent without distinguishing between the addition forms such as an oxide or a carbonate. When two or more rare earth elements are included, the content of the third subcomponent may be based on the total content.

d) Fourth Subcomponent

According to an example embodiment, the dielectric composition may further include a fourth subcomponent including one or more of an oxide and a carbonate of one or more of Ba and Ca, and Ba and the sum of the content of at least one of Ba and Ca included in the fourth subcomponent may be 4.8 mol or less based on 100 mol of the main component. The lower limit of the total content of one or more of Ba and Ca included in the fourth subcomponent may not be limited to any particular example, and may exceed 0 mol based on 100 mol of the main component preferably, and may be more preferably 0.24 mol or more based on 100 mol of the main component preferably to further improve the RC value.

Here, Ba and Ca may serve to increase the dielectric constant and the RC value.

Meanwhile, when the sum of the content of one or more of Ba and Ca is greater than 4.8 mol based on 100 mol of the main component, the room temperature dielectric constant and high-temperature withstand voltage may be deteriorated.

e) Fifth Subcomponent

According to an example embodiment, the dielectric composition may further include a fifth subcomponent including one or more of an oxide of Si, a carbonate of Si, and a glass including Si, and the content of the Si element included in the fifth subcomponent may be 0.8 mol or more and 3.0 mol or less based on 100 mol of the main component.

When the content of the Si element included in the fifth subcomponent is less than 0.8 mol or more than 3.0 mol based on 100 mol of the main component, the firing density may be low, such that the room temperature dielectric constant and high-temperature withstand voltage may be deteriorated.

Meanwhile, according to an example embodiment, the dielectric composition may further include a fourth subcomponent and a fifth subcomponent simultaneously.

When the total content of one or more among Ba and Ca included in the fourth subcomponent is defined as 4 s and the content of the Si element included in the fifth subcomponent is defined as 5 s, 4 s/5 s may be 1.60 or less.

When 4 s/5 s is greater than 1.60, the normal temperature dielectric constant and high temperature withstand voltage may be lowered.

The thickness td of the dielectric layer 111 may not be limited to any particular example.

However, to easily obtain miniaturization and high capacity of the multilayer electronic component, the thickness of the dielectric layer 111 may be 0.6 µm or less, and may be 0.4 µm or less more preferably. Generally, when the dielectric layer 111 is formed to have a thickness of 0.6 µm or less, in particular, when the thickness of the dielectric layer 111 is 0.4 µm or less, reliability may be deteriorated.

As described above, according to an example embodiment, since excellent room temperature dielectric constant, DC-bias properties, high-temperature withstand voltage properties, may be obtained, excellent reliability may be obtained even when the thickness of the dielectric layer 111 is 0.4 µm or less Accordingly, when the thickness of the dielectric layer 111 is 0.4 µm or less, the effect according to an example embodiment may be relatively remarkable, and miniaturization and high capacity of the multilayer electronic component may be easily obtained.

Here, the thickness td of the dielectric layer 111 may refer to the thickness td of the dielectric layer 111 disposed between the first and second internal electrodes 121 and 122.

Meanwhile, the thickness td of the dielectric layer 111 may refer to an average thickness td of the dielectric layer 111.

The average thickness td of the dielectric layer 111 may be measured by scanning the length and thickness direction L-T cross-section of the body 110 using a scanning electron microscope (SEM) with a magnification of 10,000 at magnification. More specifically, an average value may be measured by measuring thicknesses of 30 points of the dielectric layer, spaced apart by an equal distance, on the scanned image in the length direction. The 30 points spaced apart by an equal distance may be designated in the active portion Ac. Also, when the measuring of the average value is extended to 10 dielectric layers 111 and measuring an average value thereof, the average thickness of the dielectric layers may be further generalized. Here, the average thickness td of the dielectric layer 111 may refer to an average size of the dielectric layer 111 in the first direction.

The internal electrodes 121 and 122 may be alternately multilayer with the dielectric layer 111.

The internal electrodes 121 and 122 may include a first internal electrode 121 and a second internal electrode 122, and the first and second internal electrodes 121 and 122 may be alternately disposed to oppose each other with the dielectric layer 111 forming the body 110 interposed therebetween, and may be exposed to the third and fourth surfaces 3 and 4 of the body 110.

More specifically, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body and may be connected to the first internal electrode 121, and the second external electrode 132 may be disposed on the fourth surface 4 of the body and may be connected to the second internal electrode 122.

That is, the first internal electrode 121 may not be connected to the second external electrode 132, and may be connected to the first external electrode 131, and the second internal electrode 122 may not be connected to the first external electrode 131 and may be connected to the second external electrode 132. In this case, the first and second internal electrodes 121 and 122 may be electrically separated from each other by the dielectric layer 111 disposed therebetween.

Meanwhile, the body 110 may be formed by alternately laminating a ceramic green sheet on which the first internal electrode 121 is printed and a ceramic green sheet on which the second internal electrode 122 is printed, and firing.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), or tungsten (W), titanium (Ti), and alloys thereof.

Also, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof. As the method of printing the conductive paste for internal electrodes, a screen printing method or a gravure printing method may be used, but an example embodiment thereof is not limited thereto.

Meanwhile, the thickness to of the internal electrodes 121 and 122 may not be limited to any particular example.

An example embodiment has been described using a multilayer ceramic capacitor having a size of 3216 (3.2 mm×1.6 mm) as an example, but to easily obtain miniaturization and high capacity of the multilayer electronic component, the thickness te of the internal electrodes 121 and 122 may be 0.6 µm or less, and may be 0.4 µm or less more preferably.

Generally, when the internal electrodes 121 and 122 are formed to have a thickness of 0.6 µm or less, in particular, when the thickness of the internal electrodes 121 and 122 is 0.4 µm or less, reliability may be deteriorated.

As described above, according to an example embodiment, since excellent room temperature dielectric constant, DC-bias properties, high-temperature withstand voltage properties may be obtained, when the thickness of the internal electrodes 121 and 122 is 0.4 µm or less, excellent reliability may also be secured.

Accordingly, when the thickness of the internal electrodes 121 and 122 is 0.4 µm or less, the effect according to an example embodiment may be relatively remarkable, and miniaturization and high capacity of the multilayer electronic component may be easily obtained.

Here, the thickness te of the internal electrodes 121 and 122 may refer to an average thickness te of the internal electrodes 121 and 122.

The average thickness of the internal electrodes 121 and 122 may be measured by scanning a cross-sectional surface of the body 110 taken in the length and thickness direction (L-T) using a scanning electron microscope (SEM) at 10,000 magnification. More specifically, an average value may be measured by measuring thicknesses of 30 points of the internal electrodes 121 and 122, spaced apart by an equal distance, from the scanned image in the length direction. The 30 points spaced apart by an equal distance may be designated in the active portion Ac. Also, when the measuring of the average value is extended to 10 internal electrodes 121 and 122 and an average value thereof is measured, the average thickness of the dielectric layers may be further generalized. Here, the average thickness to of the internal electrodes 121 and 122 may refer to an average size of the internal electrodes 121 and 122 in the first direction.

The cover portions 112 and 113 may include an upper cover portion 112 disposed above the active portion Ac in the first direction and a lower cover portion 113 disposed below the active portion Ac in the first direction.

The upper cover portion 112 and the lower cover portion 113 may be formed by laminating a single dielectric layer 111 or two or more dielectric layers 111 on the upper and lower surfaces of the active portion Ac in a first direction, respectively, and may serve to prevent damages to the internal electrodes 121 and 122 due to physical or chemical stress.

The upper cover portion 112 and the lower cover portion 113 may not include the internal electrodes 121 and 122, and may include the same material as that of the dielectric layer 111. That is, the upper cover portion 112 and the lower cover portion 113 may include a ceramic material, such as, for example, a barium titanate ($BaTiO_3$) ceramic material.

The thickness tc of the cover portions 112 and 113 may not be limited to any particular example.

However, to easily obtain miniaturization and high capacity of the multilayer electronic component, the thickness tc of the cover portions 112 and 113 may be 100 μm or less, may be 30 μm or less preferably, and may be 20 μm or less more preferably in a micro-sized product.

Here, the thickness tc of the cover portions 112 and 113 may refer to an average thickness tc of the cover portions 112 and 113.

The average thickness tc of the cover portions 112 and 113 may be measured by scanning a cross-sectional surface of the body 110 taken in the length and thickness direction (L-T) using a scanning electron microscope (SEM) at 10,000 magnification. More specifically, an average value may be measured by measuring thicknesses of 30 points of one of the cover portions 112 and 113, spaced apart by an equal distance, from the scanned image in the second direction. The 30 points spaced apart by an equal distance may be designated in the upper cover portion 112. Also, when the measuring of the average value is extended to the lower cover portion 113 and an average value thereof is measured, the average thickness of the cover portions 112 and 113 may be further generalized. Here, the average thickness tc of the cover portions 112 and 113 may refer to the average size of the cover portions 112 and 113 in the first direction.

Margin portions 114 and 115 may include a first margin 114 disposed on the fifth surface 5 of the body 110 and a second margin 115 disposed on the sixth surface 6 of the body 110. That is, the margin portions 114 and 115 may be disposed on both cross-sections of the body 110 in the width direction.

The margin portions 114 and 115 may refer to a region between both cross-sections of the first and second internal electrodes 121 and 122 in the width direction and the boundary surface of the body 110 with reference to the cross-section of the body 110 in the thickness and width direction (W-T direction).

The margin portions 114 and 115 may serve to prevent damages to the internal electrodes 121 and 122 due to physical or chemical stress.

The margin portions 114 and 115 may be formed by forming the internal electrodes 121 and 122 by applying a conductive paste on the ceramic green sheet other than the region in which the margin portions 114 and 115 are formed. As described above, to prevent the step difference caused by the internal electrodes 121 and 122, cutting may be performed such that the internal electrodes 121 and 122 are exposed to the fifth and sixth surfaces 5 and 6 of the body 110 after lamination, and a single dielectric layer 111 or two or more dielectric layers 111 may be laminated on both end surfaces of the active portion Ac in the width direction, thereby forming the margin portions 114 and 115.

The width of the first and second margin portions 114 and 115 may not be limited to any particular example. However, to easily obtain miniaturization and high capacity of the multilayer electronic component 100, the widths of the first and second margin portions 114 and 115 may be 100 μm or less, and may be 30 μm or less preferably, and may be 20 μm or less more preferably in a micro-sized product.

Here, the width of the margin portions 114 and 115 may refer to an average width of the margin portions 114 and 115.

The average thickness of the margin portions 114 and 115 may be measured by scanning a cross-sectional surface of the body 110 taken in the length and thickness direction (L-T) using a scanning electron microscope (SEM) at 10,000 magnification. More specifically, an average value may be measured by measuring thicknesses of 10 points of one of the margin portions 114 and 115, spaced apart by an equal distance, from the scanned image in the second direction. The 10 points spaced apart by an equal distance may be designated in the first margin portion 114. Also, when the measuring of the average value is extended to the second margin portion 115 and an average value thereof is measured, the average thickness of the margin portions 114 and 115 may be further generalized. Here, the average thickness of the margin portions 114 and 115 may refer to the average size of the margin portions 114 and 115 in the third direction.

In an example embodiment, the structure of the ceramic electronic component 100 in which two external electrodes 131 and 132 are provided is described, but the number or shape of the external electrodes 131 and 132 may be varied depending on the shape of the internal electrode 121 and 122 and other factors.

The external electrodes 131 and 132 may be disposed on the body 110 and may be connected to the internal electrodes 121 and 122.

More specifically, the external electrodes 131 and 132 may be disposed on the third and fourth surfaces 3 and 4 of the body 110, respectively, and may include first and second external electrodes 131 and 132 connected to the first and second internal electrodes 121 and 122, respectively. That is, the first external electrode 131 may be disposed on the third surface 3 of the body and may be connected to the first internal electrode 121, and the second external electrode 132 may be disposed on the fourth surface 4 of the body and may be connected to the second internal electrode 122.

Meanwhile, the external electrodes 131 and 132 may be formed of any material having electrical conductivity, such as a metal, and a specific material may be determined in consideration of electrical properties and structural stability, and further, the external electrodes 131 and 132 may have a multilayer structure.

For example, the external electrodes 131 and 132 may include electrode layers 131a, 132a, 131b, and 132b disposed on the body 110 and plating layers 131c and 132c disposed on the electrode layers 131a, 132a, 131b, and 132b.

As a more specific example of the electrode layers 131a, 132a, 131b, and 132b, the electrode layers 131a, 132a, 131b, and 132b may be firing electrodes including a conductive metal and glass, or resin-based electrodes including a conductive metal and a resin.

Also, the electrode layers 131a, 132a, 131b, and 132b may have the form in which a sintered electrode and a resin-based electrode are formed in order on a body.

Also, the electrode layers 131a, 132a, 131b, and 132b may be formed by transferring a sheet including a conductive metal onto the body or by transferring a sheet including a conductive metal onto a firing electrode.

As a conductive metal included in the electrode layers 131a, 132a, 131b, and 132b, a material having excellent electrical conductivity may be used, and for example, the conductive metal may include one or more selected from a group consisting of nickel (Ni), copper (Cu), palladium (Pd), silver (Ag), gold (Au), platinum (Pt), tin (Sn), tungsten (W), titanium (Ti), and alloys thereof, but an example embodiment thereof is not limited thereto.

In an example embodiment, the electrode layers 131a, 132a, 131b, and 132b may have a two-layer structure including the first electrode layers 131a and 132a and the second electrode layers 131b and 132b. Accordingly, the external electrodes 131 and 132 may include the first electrode layers 131a and 132a including a conductive metal and glass and the second electrode layers 131b and 132b disposed on the first electrode layers 131a and 132a and including a conductive metal and a resin.

The first electrode layers 131a and 132a may serve to improve adhesiveness with the body 110 by including glass, and the second electrode layers 131b and 132b may improve warpage strength by including resin.

The conductive metal used in the first electrode layers 131a and 132a is not limited to any particular example as long as the material may be electrically connected to the internal electrodes 121 and 122 to form capacitance. For example, the material may include one or more selected from a group consisting of nickel (Ni), copper (Cu), palladium (Pd), silver (Ag), gold (Au), platinum (Pt), tin (Sn), tungsten (W), titanium (Ti) and alloys thereof. The first electrode layers 131a and 132a may be formed by applying a conductive paste prepared by adding a glass frit to the conductive metal powder and firing.

The conductive metal included in the second electrode layers 131b and 132b may be electrically connected to the first electrode layers 131a and 132a.

The conductive metal included in the second electrode layers 131b and 132b is not limited to any particular example as long as the material may be electrically connected to the electrode layers 131a and 132a, and the material may include one or more selected from a group consisting of nickel (Ni), copper (Cu), palladium (Pd), silver (Ag), gold (Au), platinum (Pt), tin (Sn), tungsten (W), titanium (Ti) and alloys thereof.

The conductive metal included in the second electrode layers 131b and 132b may include one or more of spherical particles and flake-shaped particles. That is, the conductive metal may be formed of only flake-shaped particles, spherical particles, or a mixture of flake-shaped particles and spherical particles. Here, the spherical particle may include spherical particles which are not perfectly spherical, and for example, the spherical particle may include particles having a form in which the ratio of the lengths of the major axis to the minor axis (long axis/short axis) is 1.45 or less. The flake-shaped particles may refer to particles having a flat and elongated shape, and are not limited to any particular example, but, for example, the ratio of the lengths of the major axis to the minor axis (long axis/short axis) may be 1.95 or more. The lengths of the major and minor axes of the spherical particles and flake-shaped particles may be measured from an image by scanning a cross-section (L-T cross-section) of the ceramic electronic component, cut-out in the central portion of the ceramic electronic component in the third direction, using a scanning electron microscope (SEM).

Resin included in the second electrode layers 131b and 132b may serve to secure adhesiveness and to absorb impacts. Resin included in the second electrode layers 131b and 132b is not limited to any particular example as long as the resin may have adhesiveness and impact absorption and may form a paste by being mixed with conductive metal powder, and may include, for example, an epoxy-based resin.

Also, the second electrode layers 131b and 132b may include a plurality of metal particles, an intermetallic compound, and resin. As the intermetallic compound is included, electrical connectivity with the first electrode layers 131a and 132a may further improve. The intermetallic compound may serve to improve electrical connectivity by connecting a plurality of metal particles to each other, and may serve to surround and connect the plurality of metal particles to each other.

In this case, the intermetallic compound may include a metal having a melting point lower than a curing temperature of resin. That is, since the intermetallic compound includes a metal having a melting point lower than the curing temperature of resin, a metal having a melting point lower than the curing temperature of resin may be melted in the process of drying and curing, and may form an intermetallic compound with a portion of the metal particles and may surround the metal particles. In this case, the intermetallic compound may preferably include a metal having a low-melting-point of 300° C. or less.

For example, the intermetallic compound may include Sn having a melting point of 213° C. to 220° C. In the process of drying and curing, Sn may be melted, and the molten Sn may wet metal particles of a high-melting-point, such as Ag, Ni or Cu by capillary action, and may react with a portion of Ag, Ni or Cu metal particles, thereby forming intermetallic compounds such as $Ag_3Sn$, $Ni_3Sn_4$, $Cu_6Sn_5$, or $Cu_3Sn$. Ag, Ni or Cu not participating in the reaction may remain in the form of metal particles.

Accordingly, the plurality of metal particles may include one or more of Ag, Ni, and Cu, and the intermetallic compound may include one or more of $Ag_3Sn$, $Ni_3Sn_4$, $Cu_6Sn_5$ and $Cu_3Sn$.

The plating layers 131c and 132c may serve to improve the mounting properties.

The type of the plating layer 131c and 132c is not limited to any particular example, and each of the plating layer 131c and 132c may be a single layer including one or more of nickel (Ni), tin (Sn), palladium (Pd), and alloys thereof, and may include a plurality of layers.

As a more specific example of the plating layers 131c and 132c, the plating layers 131c and 132c may be a Ni plating layer or a Sn plating layer, and a Ni plating layer and a Sn plating layer may be formed in order on the electrode layers 131a, 132a, 131b, and 132b, and the Sn plating layer, the Ni plating layer, and the Sn plating layer may be formed in order therein. Also, the plating layers 131c and 132c may include a plurality of Ni plating layers and/or a plurality of Sn plating layers.

The size of the multilayer electronic component 100 may not be limited to any particular example.

An example embodiment has been described with respect to the multilayer electronic component having a size of 3216 (length×width, 3.2 mm×1.6 mm), but the effect of improving DC-bias properties, and high temperature withstand voltage properties, according to an example embodiment may be realized even in multilayer electronic components of various sizes, such as, for example, a 1005 (length×width, 1.0 mm×0.5 mm) size or a 0402 (length×width, 0.4 mm×0.2 mm) size.

Method of Manufacturing Multilayer Electronic Component

Figure 12:
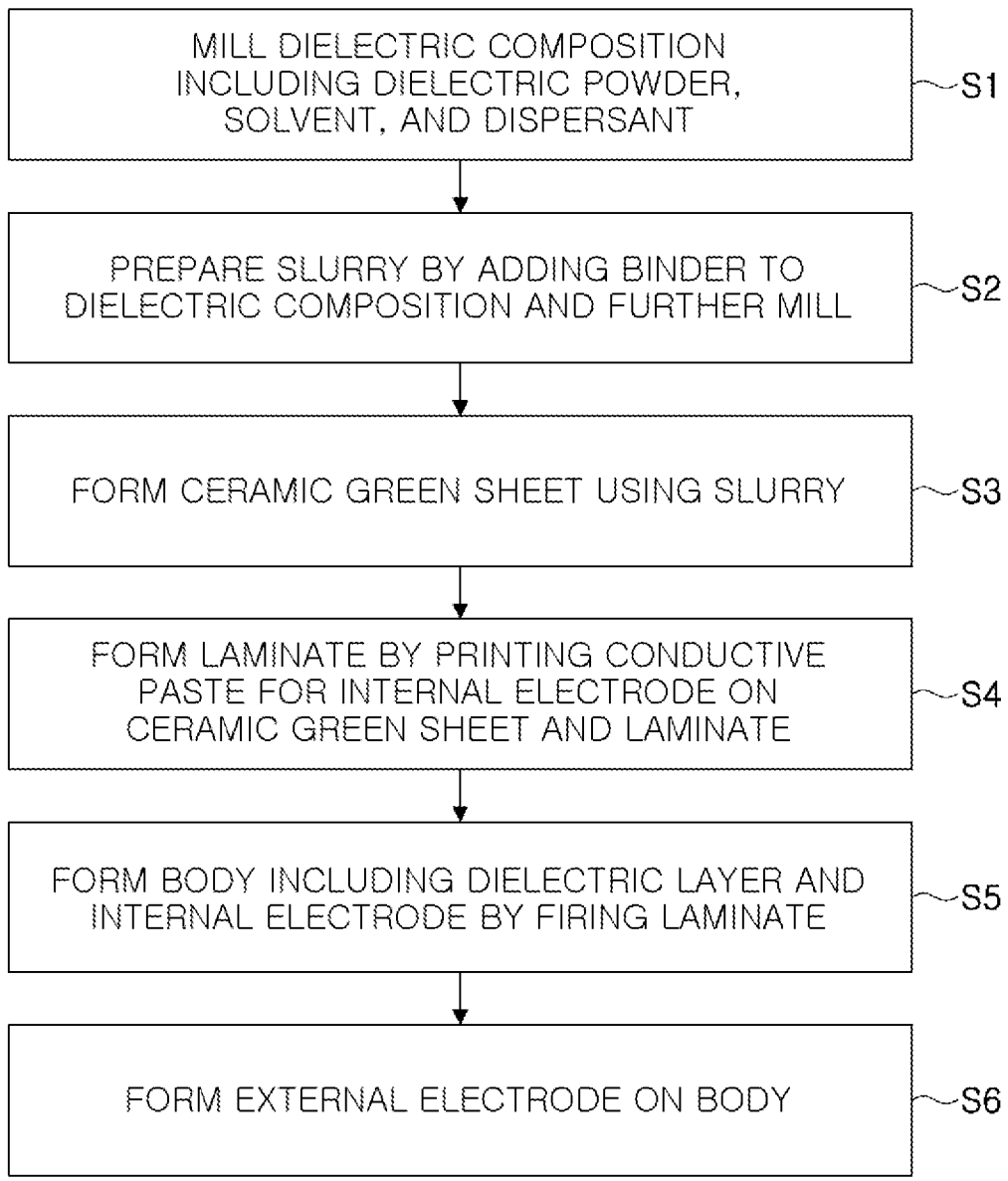
FIG. 12 is a diagram illustrating processes of a method of manufacturing a multilayer electronic component according to another example embodiment of the present disclosure.

FIG. 12 is a diagram illustrating processes of a method of manufacturing a multilayer electronic component according to another example embodiment.

Hereinafter, a method of manufacturing a multilayer electronic component according to another example embodiment will be described, and a multilayer ceramic capacitor will be described as an example, but an example embodiment thereof is not limited thereto. Also, descriptions overlapping the above-described multilayer electronic component among the description of the method for manufacturing the multilayer electronic component according to the example embodiment will not be provided.

The method of manufacturing a multilayer electronic component according to another example embodiment may include milling a dielectric composition including a dielectric powder as a main component, and a solvent and a dispersant (S1); preparing a slurry by adding a binder to the dielectric composition and conducting further milling (S2); forming a ceramic green sheet using the slurry (S3); forming a laminate by printing a conductive paste for an internal electrode on the ceramic green sheet and laminating (S4); forming a body including a dielectric layer and an internal electrode by firing the laminate (S5); and forming an external electrode on the body (S6), and the milling (S1) may be performed such that one or more first dielectric grains in which the sum of lengths of defects in the dielectric grains included in the dielectric layer may be 150 nm or more.

In the example embodiment, the type of defect may not be limited to any particular example, and the defect may be one or more of a line defect (one-dimensional) and a planar defect (two-dimensional).

However, as described above, when the defect is a dislocation, the effect of facilitating the diffusion of the additive elements according to an example embodiment into the grains and the effect of facilitating solid-solution of Si in the BT crystal lattice of the grain boundary region may significantly improve. That is, to implement the effect of increasing reliability described in the example embodiments, the defect may be a dislocation preferably.

Hereinafter, in relation to a defect, a dislocation, which is a line defect, will be described as an example, but an example embodiment thereof is not limited thereto. As defects other than the dislocation are formed in the dielectric grains, the example in which the effect of facilitating diffusion of additive elements into the grains and the effect of facilitating Solid-solution of Si in the BT crystal lattice of the grain boundary region may be secured may be included.

The method of manufacturing a multilayer electronic component according to an example embodiment may include the milling a dielectric composition including a dielectric powder as a main component and a solvent and a dispersant (S1).

In the example embodiment, preparing a dielectric composition including $BaTiO_3$ dielectric powder as a main component, and a solvent and a dispersant may be included.

The method of manufacturing the $BaTiO_3$-based main component base material may not be limited to any particular example. For example, the material may be prepared using a hydrothermal synthesis method, a solid phase method, an oxalate method, and the like.

The average diameter size of the dielectric powder may be 50 nm or more and 300 nm or less, may be 100 nm or more and 200 nm or less preferably, and may be 140 nm or more and 160 nm or less more preferably.

A dielectric composition may be prepared by adding a solvent and a dispersant to the dielectric powder. In this case, the added solvent may be a general solvent used for manufacturing the multilayer electronic component, that is, for example, an ethanol/toluene solvent, and as the added dispersant, a general dispersant may be used.

As the method of milling the dielectric composition, batch milling using zirconia beads as mixing/dispersing media may be used, but an example embodiment thereof is not limited thereto, and various milling methods such as wet/dry grinding may be used if desired.

The milling may be performed such that one or more first dielectric grains 10 and 10' in which the sum of the lengths of dislocations in the dielectric grains included in the dielectric layer is 150 nm or more may be included. As the milling is performed, dislocations may be formed in the dielectric composition, and the formed dislocations may remain the dielectric layer 111 of the chip-type multilayer electronic component 100, which is a final product, even after the firing process.

Here, it may be sufficient to perform milling to include one or more first dielectric grain 10 and 10' in which the sum of the lengths of dislocations in the dielectric grains included in the dielectric layer 111 is 150 nm or more, and the specific conditions may be appropriately determined in consideration of conditions such as milling time, dielectric powder, and beads.

As a preferable example, the milling of the dielectric composition may be performed for 4 hours or more in the batch.

When the milling is performed for 4 hours or more, it may be easy to manufacture such that the sum of the lengths of dislocations formed in the dielectric grains is 150 nm or more.

Meanwhile, when the milling is performed for less than 4 hours, it may be difficult to form the sum of the lengths of sufficient dislocations, such that it may be difficult to realize the effect of increasing reliability, solid-solution of the Si crystal lattice may not be smooth such that the effect of increasing reliability may be insignificant.

In an example embodiment, the milling the dielectric composition may be performed for at least 4 hours and less than 30 hours in the batch.

As the milling time of the dielectric composition increases, the sum of the lengths of dislocations formed in the dielectric composition may tend to increase.

Meanwhile, when the milling is performed for less than 4 hours, the same issues as described above may occur, and when the milling is performed for 30 hours or more, the sum of the lengths of dislocations may be formed to be 843 nm or more, such that, although the effect of increasing reliability and the effect of increasing reliability obtained by smooth solid-solution of Si may be easily realized, the dielectric constant may be lowered.

Meanwhile, the dielectric composition may be formed by further including an additive in the dielectric powder.

As described above, the additives added to the dielectric powder may refer to subcomponents in the dielectric composition, and may refer to subcomponents in the dielectric grains after sintering. The description of the subcomponents may be the same as described above, and will thus not be provided.

Thereafter, the preparing a slurry by adding a binder to the dielectric composition and conducting further milling (S2) may be included.

As the binder, a generally used binder may be used, and additional milling may be performed for 4 to 6 hours, preferably 5 hours, such that the materials included in the slurry may be uniformly mixed.

Thereafter, the forming a ceramic green sheet using the prepared slurry (S3) may be included.

The ceramic green sheet may be prepared in the form of a sheet by preparing a slurry by mixing a ceramic powder, a binder, and a solvent and forming the slurry into a sheet having a thickness of several μm by a doctor blade method.

Thereafter, the method may include the forming a laminate by printing a conductive paste for internal electrodes on the ceramic green sheet and laminating (S4).

An internal electrode pattern may be formed by applying a conductive paste for an internal electrode on a ceramic green sheet, and a method of forming the internal electrode pattern is not limited to any particular example, but may be formed by a screen printing method or a gravure printing method. The green sheet on which the internal electrode pattern is printed may be laminated and may be compressed by pressing in the lamination direction. Accordingly, a laminate in which the internal electrode pattern is formed may be formed.

Thereafter, the forming a body including a dielectric layer and an internal electrode by sintering the laminate (S5) may be performed.

In this case, the laminate may be cut at each region corresponding to a multilayer electronic component, and may be cut such that one end of the internal electrode pattern may be alternately exposed through the side surface. Thereafter, a laminate formed into a chip may be formed through cutting, and firing may be performed. The firing may be performed in a reducing atmosphere, and may be performed while controlling a temperature increase rate.

In an example embodiment, when performing the firing in the process (S5) of forming the body, the firing may be performed in a reducing atmosphere of 0.1% to 3.0% $H_2$/97.0% to 99.9% $N_2$ ($H_2O/H_2/N_2$ atmosphere) conditions, more preferably, 0.1% to 0.5% $H_2$/99.5% to 99.9% $N_2$ ($H_2O/H_2/N_2$ atmosphere) conditions.

More specifically, here, the hydrogen concentration of 0.1% may correspond to the condition of the electromotive force (EMF) of 680 mV in the oxygen partial pressure meter, and the 0.5% hydrogen concentration may correspond the electromotive force of 760 mV. The higher the hydrogen concentration, the higher the electromotive force in the oxygen partial pressure meter may be.

When the hydrogen concentration atmosphere is less than 0.1%, the content of Si as a solute in the crystal lattice may be low, such that reliability improvement may be deteriorated, and accordingly, the effect of improving reliability may be excellent when the sintering is performed in an atmosphere in which the hydrogen concentration may be 0.1% or more, or may be 0.5% or more preferably. The higher the hydrogen concentration, the higher the content of Si solute, such that effect of improving reliability may improve.

In this case, the preferable firing temperature in the reducing atmosphere may be 1000° C. to 1300° C., and may be 1150° C. to 1200° C. more preferably.

The firing may be performed for 1 hour to 3 hours, and may be performed for 2 hours more preferably.

Thereafter, the method may further include a re-oxidation process of performing re-oxidation heat treatment at a temperature lower than the firing temperature.

Through this, by preventing additional firing of the dielectric layer and internal electrodes, the formation of structurally weak dielectric layers may be prevented, such that reliability of the multilayer electronic component may improve.

More specifically, the reoxidation process may be performed at 900° C. to 1100° C., more preferably 1000° C., which is a temperature lower than the firing temperature in an $N_2$ reducing atmosphere, and the reoxidation may be performed for 2 to 4 hours, or may be for 3 hours more preferably.

Thereafter, the method may include the forming an external electrode on the body (S6).

In this case, the external electrodes 131 and 132 may be formed by applying an external electrode paste to the external region of the body 110, and for example, the external electrodes 131 and 132 may be formed to be electrically connected to the internal electrodes 121 and 122 exposed to one surface of the body 110. More specifically, the external electrodes 131 and 132 may be disposed on the third and fourth surfaces 3 and 4 which may be both end surfaces of the body 110 in the second direction. The external electrodes 131 and 132 may include a single layer or a plurality of layers, and the formation method, component, and structure may be the same as described above, and will thus not be provided.

Hereinafter, the example embodiment will be described in greater detail through experimental examples, but an example embodiment thereof is not limited thereto.

Experimental Example

As the main component base material, $BaTiO_3$ powder having an average particle size of 150 nm was used. Using zirconia beads as mixing/dispersing media, the raw material powder including the subcomponents having the compositions listed in Tables 1, 3 and 5 and the main component $BaTiO_3$ powder were mixed with ethanol/toluene solvent, and a dispersing agent, and may be milled in the batch for 2 to 30 hours, and the binder was added, and additional milling was performed for 5 hours. The prepared slurry was used to prepare a molded sheet having a thickness of 3.0 μm and 10.0 μm using a sheet forming machine. The Ni internal electrode was printed on the formed sheet. The upper and lower covers were manufactured by laminating 25 layers of cover sheets (thickness of 10 to 13 μm), printed active sheets of 21 layers were compressed and laminated, and a bar was manufactured. The compressed bar was cut into 3216 (3.2 mm×1.6 mm) size chips using a cutter.

The manufactured MLCC chip of the size of 3216 was fired, and was sintered in a reducing atmosphere of 0.1% to 0.5% $H_2$/99.5% to 99.9% $N_2$ ($H_2O/H_2/N_2$ atmosphere) for 2 hours while maintaining the temperature of 1150° C. to 1200° C., and re-oxidation was heat-treated for 3 hours in an $N_2$ atmosphere at 1000° C.

Here, the hydrogen concentration of 0.1% may correspond to the electromotive force 680 mV in the oxygen partial pressure meter, and the 0.5% hydrogen concentration may correspond to the electromotive force of 760 mV. A termination process and electrode firing were performed on the fired chip using Cu paste, thereby forming the external electrode.

Accordingly, after firing, an MLCC chip having a size of 3.2 mm×1.6 mm in which the thickness of the dielectric was about 2.0 μm, and the number of dielectric layers was 20 was manufactured.

Room temperature dielectric constant, dissipation factor (DF), RC value, temperature coefficient of capacitance (TCC), and HALT MTTF were evaluated for the completed prototype multilayer ceramic capacitor chip.

As for room temperature capacitance and dielectric loss of the MLCC chip, capacitance was measured using an LCR meter under the conditions of 1 kHz and AC 0.5V/μm. The dielectric constant of the MLCC chip was calculated from the capacitance, the dielectric thickness of the MLCC chip, the internal electrode region, and the number of layers. As for insulation resistance (IR) at room temperature, 10 sample chips were taken and DC 10 V/μm was applied, and the IR was measured after 60 seconds. The change in capacitance according to temperature was measured in a temperature range of −55° C. to 125° C. As for the accelerated life time test (HALT), the mean time to failure (MTTF) was calculated by applying a voltage corresponding to an electric field condition of 42 V/μm to 40 specimens of each type at a temperature condition of 150° C. and measuring the time at which malfunctioning occurred. Tables 2, 4 and 6 list properties of the prototype MLCC chip corresponding to the example embodiments specified in Tables 1, 3 and 5.

In the embodiment, a dielectric which may implement an entirety of properties, such as high capacity and X7R or X7S capacity-temperature properties, and high high-temperature reliability in a reducing atmosphere firing condition to which Ni internal electrodes may be applied, and an MLCC chip to which the dielectric is applied may be obtained.

As properties determination criterion for this, properties in which dielectric constant≥2000, MTTF≥100 hours in accelerated life evaluation (HALT) applying an electric field condition of 42 V/μm at a temperature condition of 150° C., RC value≥1000 ΩF, and TCC≤±22% in a temperature range of −55° C. to 125° C. were aimed, and the embodiments which may implement the properties will be described below.

RC value may be a product of a room temperature capacity value measured at AC 0.2 V/μm, 1 kHz and an insulation resistance value measured at DC 10 V/μm.

Embodiments 1-1 to 1-6 in Table 2 list the properties of the prototype MLCC chip corresponding to the embodiments.

In the shortest batch milling time of 2 hours (embodiment 1-1), a grain boundary in which the sum of the lengths of dislocations within a grain is 150 nm or more and a grain boundary in which Si in the BT lattice was solid-solute (present as a solute) by 3.0 at % or more were not observed, and the MTTF value was 52 hours in HALT evaluation under a temperature condition of 150° C. and an electric field condition of 42 V/μm, less than 100 hours, which was low. When the batch milling time was increased to 4 hours (embodiment 1-2), grain boundaries (GB) in which Si was solid-solute (present as a solute) by 3.0 at % or more were not observed, but grains in which the sum of the lengths of dislocations within a grain is 150 nm or more appeared, and in this case, the MTTF was greatly improved to 105 hours

TABLE 1

| Embodiments | Batch milling time | Firing Atmosphere EMF (mV) (@850° C.) | First subcomponent MnO$_2$ | V$_2$O$_5$ | Second subcomponent MgCO$_3$ | Third subcomponent Dy$_2$O$_3$ | Fourth subcomponent BaCO$_3$ | CaCO$_3$ | Fifth subcomponent SiO$_2$ | (Ba + Ca)/Si ratio |
|---|---|---|---|---|---|---|---|---|---|---|
| 1-1 | 2.0  | 760 | 0.200 | 0.100 | 1.00 | 0.50 | 0.80 | 0.00 | 1.65 | 0.48 |
| 1-2 | 4.0  | 760 | 0.200 | 0.100 | 1.00 | 0.50 | 0.80 | 0.00 | 1.65 | 0.48 |
| 1-3 | 6.0  | 760 | 0.200 | 0.100 | 1.00 | 0.50 | 0.80 | 0.00 | 1.65 | 0.48 |
| 1-4 | 8.0  | 760 | 0.200 | 0.100 | 1.00 | 0.50 | 0.80 | 0.00 | 1.65 | 0.48 |
| 1-5 | 10.0 | 760 | 0.200 | 0.100 | 1.00 | 0.50 | 0.80 | 0.00 | 1.65 | 0.48 |
| 1-6 | 30.0 | 760 | 0.200 | 0.100 | 1.00 | 0.50 | 0.80 | 0.00 | 1.65 | 0.48 |
| 2-1 | 8.0  | 680 | 0.200 | 0.100 | 1.00 | 0.50 | 0.80 | 0.00 | 1.65 | 0.48 |
| 2-2 | 8.0  | 760 | 0.200 | 0.100 | 1.00 | 0.50 | 0.80 | 0.00 | 0.80 | 1.00 |
| 2-3 | 2.0  | 760 | 0.200 | 0.100 | 1.00 | 0.50 | 0.80 | 0.00 | 3.00 | 0.27 |

TABLE 2

| Embodiments | Proto-type MLCC Chip properties | | | | | | | | | |
|---|---|---|---|---|---|---|---|---|---|---|
| | Sum of dislocation lengths (nm) | Whether dislocation is included | Whether Si solute is present at GB | Room temperature dielectric constant | DF (%) | RC (ΩF) | TCC (%) (−55° C.) | TCC (%) (125° C.) | MTTF (h) 150° C. 42 V/um | Determination on properties |
| 1-1 | 45  | X | X | 3536 | 6.12 | 2014 | −13.5% | −14.2% | 52  | X |
| 1-2 | 158 | ○ | X | 3240 | 6.25 | 2052 | −13.8% | −14.6% | 105 | ○ |
| 1-3 | 235 | ○ | ○ | 3057 | 6.53 | 2284 | −14.2% | −15.3% | 156 | ○ |
| 1-4 | 366 | ○ | ○ | 2885 | 6.74 | 2305 | −14.2% | −16.2% | 185 | ○ |
| 1-5 | 580 | ○ | ○ | 2505 | 7.02 | 2358 | −15.2% | −17.5% | 205 | ○ |
| 1-6 | 843 | ○ | ○ | 1946 | 7.21 | 2506 | −15.5% | −18.4% | 224 | X |
| 2-1 | 342 | ○ | X | 2885 | 6.74 | 2305 | −14.2% | −16.2% | 103 | ○ |
| 2-2 | 415 | ○ | X | 2947 | 6.55 | 2846 | −13.9% | −16.1% | 112 | ○ |
| 2-3 | 28  | X | ○ | 2684 | 5.67 | 2123 | −15.5% | −14.7% | 46  | X |

Embodiments 1-1 to 1-6 in Table 1 indicate the examples according to batch process mixing milling time when the sum of the first subcomponent variable valence elements (Mn, V) was 0.3 mol based on 100 mol of the main component, the content of the second subcomponent Mg was 1.0 mol based on 100 mol of the main component, the content of the third subcomponent Dy$_2$O$_3$ was 0.5 mol based on 100 mol of the main component (1.0 mol based on the element Dy), the content of the fourth subcomponent Ba and Ca was 0.8 mol based on 100 mol of the main component, and the content of the fifth subcomponent SiO$_2$ was 1.65 mol based on 100 mol of the main component. The ratio of the content of Ba and Ca in the fourth subcomponent to the content of Si in the fifth subcomponent is the (Ba+Ca)/Si ratio.

or more, such that the target properties according to the example embodiment were realized. When the batch milling time is increased to 6 hours (embodiment 1-3), grains in which the sum of the lengths of dislocations in a grain is 150 nm or more were present, and grain boundaries in which Si was solid-solute (present as a solute) in the BT lattice by 3.0 at % or more was observed, and in this case, the MTTF was 156 hours, which is higher than in embodiments 1-1 and 1-2. When the batch milling time is further increased to 8 hours and 10 hours (embodiments 1-4, 1-5), grains in which the sum of the lengths of dislocations in a grain is 150 nm or more were present, and grain boundaries in which Si was solid-solute (present as a solute) in the BT lattice by 3.0 at % or more was easily simultaneously observed, the MTTF was further increased to 185 hours and 205 hours, respectively. When the batch milling time is lengthened to 30 hours (embodiment 1-6), grains in which the sum of the lengths of dislocations in a grain is 150 nm or more were present, and grain boundaries in which Si was solid-solute (present as a solute) in the BT lattice by 3.0 at % or more was easily simultaneously observed, and the MTTF was further increased to 224 hours, but there was the issue in which the dielectric constant was lowered to less than 2000. Accordingly, within the range in which the dielectric constant is 2000 or more, when a microstructure in which grains in which the sum of the lengths of dislocations in a grain is 150 nm or more were present, and grain boundaries in which Si was solid-solute (present as a solute) in the BT lattice by 3.0 at % or more are simultaneously present is implemented, the overall properties in which dielectric constant≥2000, HALT MTTF≥100 hours at a temperature condition of 150° C. and electric field condition of 42 V/μm, RC value≥1000 ΩF, and TCC≤±22% in a temperature range of −55° C. to 125° C. may be satisfied.

In embodiment 2-1, the same batch milling times and subcomponents as in embodiment 1-4 were applied, but firing was carried out in a firing atmosphere with EMF 680 mV (hydrogen concentration 0.1%) lower than the firing atmosphere EMF 760 mV (hydrogen concentration 0.5%), and embodiment 2-1 in Table 2 lists the properties of the prototype MLCC chip corresponding to the above conditions. That is, in embodiment 2-1, even when the same composition and batch milling time as in embodiment 1-4 are applied, under the condition in which the hydrogen concentration in the plastic atmosphere is low, although the sum of the lengths of dislocations in the grains is 150 nm or more, and the MTTF was 103 hours, of which properties are good, there was no grain boundary in which Si was solid-solute (present as a solute) in a BT lattice by 3.0 at % or more, which indicates a lower level than that of 185 hours of MTTF in embodiment 1-4. The conditions in embodiment 2-2 may be the same as the conditions in embodiment 1-4, but only the $SiO_2$ content was reduced to 0.8 mol based on 100 mol of the main component. In this case, although the same batch milling time and firing atmosphere as in Examples 1-4 were applied, but when the $SiO_2$ content was low, the sum of the lengths of dislocations in the grains was 150 nm or more, and although the MTTF was 112 hours, which was good, there was no grain boundary in which Si is solid-solute (present as a solute) in the BT lattice by 3.0 at % or more, which was lower level than the 185 hours of MTTF in embodiment 1-4. In embodiment 2-3, the $SiO_2$ content in embodiment 1-1 was increased to 3.0 mol based on 100 mol of the main component, and when the batch milling time is as short as 2 hours and the $SiO_2$ content is high, the grain boundaries in which Si is solid-solute (present as a solute) in the BT lattice by 3.0 at % or more was present, but there were no grains in which the sum of the lengths of dislocations in the grains is 150 nm or more, and in this case, MTTF was 46 hours, which did not satisfy the MTTF≥100 hours, which is the target properties according to the example embodiment.

Accordingly, to realize the target properties according to the example embodiment, MTTF≥100 hours, grains in which the sum of the lengths of dislocations in the grains is 150 nm or more may need to be present, and further, when grain boundaries in which Si is solid-solute (present as a solute) in the BT lattice by 3.0 at % or more, MTTF may further improve.

TABLE 3

| Embodiments | Batch milling time | Firing Atmosphere EMF (mV) (@850° C.) | First subcomponent $MnO_2$ | First subcomponent $V_2O_5$ | Second subcomponent $MgCO_3$ | Third subcomponent $Dy_2O_3$ | Fourth subcomponent $BaCO_3$ | Fourth subcomponent $CaCO_3$ | Fifth subcomponent $SiO_2$ | (Ba + Ca)/Si ratio |
|---|---|---|---|---|---|---|---|---|---|---|
| 3-1 | 8.0 | 760 | 0.200 | 0.100 | 1.00 | 0.20 | 0.80 | 0.00 | 1.65 | 0.48 |
| 3-2 | 8.0 | 760 | 0.200 | 0.100 | 1.00 | 0.30 | 0.80 | 0.00 | 1.65 | 0.48 |
| 3-3 | 8.0 | 760 | 0.200 | 0.100 | 1.00 | 0.50 | 0.80 | 0.00 | 1.65 | 0.48 |
| 3-4 | 8.0 | 760 | 0.200 | 0.100 | 1.00 | 1.50 | 0.80 | 0.00 | 1.65 | 0.48 |
| 3-5 | 8.0 | 760 | 0.200 | 0.100 | 1.00 | 2.00 | 0.80 | 0.00 | 1.65 | 0.48 |
| 4-1 | 8.0 | 760 | 0.200 | 0.100 | 0.00 | 0.50 | 0.80 | 0.00 | 1.65 | 0.48 |
| 4-2 | 8.0 | 760 | 0.200 | 0.100 | 1.00 | 0.50 | 0.80 | 0.00 | 1.65 | 0.48 |
| 4-3 | 8.0 | 760 | 0.200 | 0.100 | 2.00 | 0.50 | 0.80 | 0.00 | 1.65 | 0.48 |
| 4-4 | 8.0 | 760 | 0.200 | 0.100 | 2.50 | 0.50 | 0.80 | 0.00 | 1.65 | 0.48 |
| 5-1 | 8.0 | 760 | 0.050 | 0.025 | 1.00 | 0.50 | 0.80 | 0.00 | 1.65 | 0.48 |
| 5-2 | 8.0 | 760 | 0.100 | 0.050 | 1.00 | 0.50 | 0.80 | 0.00 | 1.65 | 0.48 |
| 5-3 | 8.0 | 760 | 0.700 | 0.350 | 1.00 | 0.50 | 0.80 | 0.00 | 1.65 | 0.48 |
| 5-4 | 8.0 | 760 | 1.000 | 0.500 | 1.00 | 0.50 | 0.80 | 0.00 | 1.65 | 0.48 |
| 5-5 | 8.0 | 760 | 0.500 | 0.000 | 1.00 | 0.50 | 0.80 | 0.00 | 1.65 | 0.48 |
| 5-6 | 8.0 | 760 | 0.000 | 0.250 | 1.00 | 0.50 | 0.80 | 0.00 | 1.65 | 0.48 |

TABLE 4

| | | | Proto-type Chip properties | | | | | | |
|---|---|---|---|---|---|---|---|---|---|
| Embodiments | Whether dislocation is included | Whether Si solute is present at GB | Room temperature dielectric constant | DF (%) | RC (ΩF) | TCC (%) (−55° C.) | TCC (%) (125° C.) | MTTF (h) 150° C. 42 V/um | Determination on properties |
| 3-1 | ○ | ○ | 2748 | 5.63 | 2365 | −12.4% | −14.6% | 55 | X |
| 3-2 | ○ | ○ | 2854 | 5.78 | 2456 | −14.2% | −15.7% | 135 | ○ |
| 3-3 | ○ | ○ | 2885 | 6.74 | 2305 | −14.2% | −16.2% | 185 | ○ |
| 3-4 | ○ | ○ | 2508 | 4.07 | 2840 | −18.4% | −21.0% | 164 | ○ |
| 3-5 | ○ | ○ | 2240 | 3.59 | 3002 | −21.5% | −24.6% | 83 | X |
| 4-1 | ○ | ○ | 2647 | 4.58 | 1352 | −14.5% | −11.3% | 156 | ○ |

TABLE 4-continued

Proto-type Chip properties

| Embodiments | Whether dislocation is included | Whether Si solute is present at GB | Room temperature dielectric constant | DF (%) | RC (ΩF) | TCC (%) (−55° C.) | TCC (%) (125° C.) | MTTF (h) 150° C. 42 V/um | Determination on properties |
|---|---|---|---|---|---|---|---|---|---|
| 4-2 | ○ | ○ | 2835 | 4.65 | 2571 | −15.0% | −17.4% | 162 | ○ |
| 4-3 | ○ | ○ | 2682 | 3.45 | 2456 | −15.4% | −19.8% | 132 | ○ |
| 4-4 | ○ | ○ | 2437 | 3.11 | 2785 | −15.6% | −21.0% | 55 | X |
| 5-1 | ○ | ○ | 3023 | 5.28 | 2312 | −15.5% | −19.4% | 45 | X |
| 5-2 | ○ | ○ | 2684 | 3.55 | 2284 | −15.0% | −20.1% | 174 | ○ |
| 5-3 | ○ | ○ | 2323 | 3.45 | 1352 | −14.8% | −15.4% | 153 | ○ |
| 5-4 | ○ | ○ | 2256 | 3.37 | 685 | −14.2% | −14.3% | 76 | X |
| 5-5 | ○ | ○ | 2873 | 4.67 | 2341 | −15.5% | −16.6% | 185 | ○ |
| 5-6 | ○ | ○ | 2826 | 4.62 | 1640 | −16.2% | −16.7% | 188 | ○ |

Embodiments 3-1 to 5-6 in Table 3 list the embodiments according to changes in the contents of the third, second, and first subcomponents based on 100 mol of the $BaTiO_3$ base material having a size of 150 nm as the main component, and Table 4 lists properties of the prototype MLCC chip corresponding to these embodiments.

Embodiments 3-1 to 3-5 relate to the embodiments according to the change in the content of $Dy_2O_3$, which is the third subcomponent.

When the content of the third subcomponent $Dy_2O_3$ was low at 0.2 mol based on 100 mol of the main component or 0.4 at % in element ratio (embodiment 3-1), MTTF exhibited deteriorated properties of 55 hours, which is less than 100 hours targeted in the example embodiment, such that the properties was not implemented. Even when the content of $Dy_2O_3$ was excessively large at 2.0 mol based on 100 mol of the main component or 4.0 at % in element ratio (embodiment 3-5), MTTF exhibited deteriorated properties of 83 hours, which is less than 100 hours targeted in the example embodiment, and also, the TCC properties also deviated by ±22% or more, such that the target properties according to the example embodiment was not realized. When the content of $Dy_2O_3$ satisfies the range of 0.3 to 1.5 mol based on 100 mol of the main component or 0.6 to 3.0 at % in terms of Dy element ratio (embodiments 3-2 to 3-4), the overall properties in which dielectric constant≥2000, HALT MTTF≥100 hours at a temperature condition of 150° C. and electric field condition of 42 V/μm, RC value≥1000≥ΩF, and TCC≤±22% in a temperature range of −55° C. to 125° C. may be satisfied.

Embodiments 4-1 to 4-4 correspond to the examples according to the change in the content of $MgCO_3$, which is the second subcomponent. When the second subcomponent Mg is added, an effect of increasing the RC value may be realized.

When the content of the second subcomponent $MgCO_3$ was as high as 2.5 mol based on 100 mol of the main component or 2.5 at % (embodiment 4-4), the MTTF was 55 hours, which is less than the 100 hours targeted in the example embodiment, such that the properties may not be realized. Accordingly, when the content of $MgCO_3$ satisfied the range of 0 to 2.0 mol based on 100 mol of the main component or 0 to 2.0 at % in terms of the Mg element ratio (embodiments 4-1 to 4-3), the overall properties targeted in the example embodiment may be realized.

Embodiments 5-1 to 5-6 correspond to examples according to a change in the content of $MnO_2$ or $V_2O_5$ which are the first subcomponents. The content of the first subcomponent may refer to the sum of the contents of $MnO_2$ or $V_2O_5$, and when only one of the materials is added, the content may refer to the content of $MnO_2$ or $V_2O_5$.

When the sum of the contents of the transition metals Mn and V, which are the first subcomponents, was too small at less than 0.1 at % in the element ratio (embodiment 5-1), the MTTF was 45 hours, which is less than 100 hours targeted in the example embodiment, such that the properties was not implemented. When $MnO_2$ or $V_2O_5$ was added alone with Mn alone or V alone by 0.5 at % in the element ratio (embodiments 5-5 to 5-6), the target properties according to the example embodiment may be realized in both cases. Accordingly, when the content of the first subcomponent satisfies the range of 0.2 to 1.4 at % in element ratio (embodiments 5-2 to 5-6), overall properties targeted in the example embodiment may be realized.

TABLE 5

| Embodiments | Batch milling time | Firing atmosphere EMF (mV) (@850° C.) | First subcomponent $MnO_2$ | First subcomponent $V_2O_5$ | Second subcomponent $MgCO_3$ | Third subcomponent $Dy_2O_3$ | Fourth subcomponent $BaCO_3$ | Fourth subcomponent $CaCO_3$ | Fifth subcomponent $SiO_2$ | (Ba + Ca)/Si ratio |
|---|---|---|---|---|---|---|---|---|---|---|
| 6-1 | 8.0 | 760 | 0.200 | 0.100 | 1.00 | 0.50 | 0.00 | 0.00 | 0.50 | 0.00 |
| 6-2 | 8.0 | 760 | 0.200 | 0.100 | 1.00 | 0.50 | 0.24 | 0.00 | 0.50 | 0.48 |
| 6-3 | 8.0 | 760 | 0.200 | 0.100 | 1.00 | 0.50 | 0.80 | 0.00 | 0.50 | 1.60 |
| 7-1 | 8.0 | 760 | 0.200 | 0.100 | 1.00 | 0.50 | 0.00 | 0.00 | 0.80 | 0.00 |
| 7-2 | 8.0 | 760 | 0.200 | 0.100 | 1.00 | 0.50 | 0.38 | 0.00 | 0.80 | 0.48 |
| 7-3 | 8.0 | 760 | 0.200 | 0.100 | 1.00 | 0.50 | 1.28 | 0.00 | 0.80 | 1.60 |
| 7-4 | 8.0 | 760 | 0.200 | 0.100 | 1.00 | 0.50 | 1.50 | 0.00 | 0.80 | 1.88 |
| 8-1 | 8.0 | 760 | 0.200 | 0.100 | 1.00 | 0.50 | 0.20 | 0.00 | 1.65 | 0.12 |
| 8-2 | 8.0 | 760 | 0.200 | 0.100 | 1.00 | 0.50 | 0.40 | 0.00 | 1.65 | 0.24 |
| 8-3 | 8.0 | 760 | 0.200 | 0.100 | 1.00 | 0.50 | 0.80 | 0.00 | 1.65 | 0.48 |
| 8-4 | 8.0 | 760 | 0.200 | 0.100 | 1.00 | 0.50 | 2.64 | 0.00 | 1.65 | 1.60 |
| 8-5 | 8.0 | 760 | 0.200 | 0.100 | 1.00 | 0.50 | 3.10 | 0.00 | 1.65 | 1.88 |

TABLE 5-continued

| Embodiments | Batch milling time | Firing atmosphere EMF (mV) (@850° C.) | First subcomponent MnO₂ | First subcomponent V₂O₅ | Second subcomponent MgCO₃ | Third subcomponent Dy₂O₃ | Fourth subcomponent BaCO₃ | Fourth subcomponent CaCO₃ | Fifth subcomponent SiO₂ | (Ba + Ca)/Si ratio |
|---|---|---|---|---|---|---|---|---|---|---|
| 8-6 | 8.0 | 760 | 0.200 | 0.100 | 1.00 | 0.50 | 0.40 | 0.40 | 1.65 | 0.48 |
| 8-7 | 8.0 | 760 | 0.200 | 0.100 | 1.00 | 0.50 | 0.00 | 0.80 | 1.65 | 0.48 |
| 9-1 | 8.0 | 760 | 0.200 | 0.100 | 1.00 | 0.50 | 0.00 | 0.00 | 3.00 | 0.00 |
| 9-2 | 8.0 | 760 | 0.200 | 0.100 | 1.00 | 0.50 | 1.45 | 0.00 | 3.00 | 0.48 |
| 9-3 | 8.0 | 760 | 0.200 | 0.100 | 1.00 | 0.50 | 4.80 | 0.00 | 3.00 | 1.60 |
| 9-4 | 8.0 | 760 | 0.200 | 0.100 | 1.00 | 0.50 | 5.63 | 0.00 | 3.00 | 1.88 |
| 10-1 | 8.0 | 760 | 0.200 | 0.100 | 1.00 | 0.50 | 0.00 | 0.00 | 4.00 | 0.00 |
| 10-2 | 8.0 | 760 | 0.200 | 0.100 | 1.00 | 0.50 | 6.40 | 0.00 | 4.00 | 1.60 |

TABLE 6

Proto-type Chip Properties

| Embodiments | Whether dislocation is included | Whether Si solute is present at GB | Room temperature dielectric constant | DF (%) | RC (ΩF) | TCC (%) (−55° C.) | TCC (%) (125° C.) | MTTF (h) 150° C. 42 V/um | Determination on properties |
|---|---|---|---|---|---|---|---|---|---|
| 6-1 | X | X | 1580 | 1.52 | 1135 | — | — | 30 | X |
| 6-2 | X | X | 1764 | 1.63 | 1250 | — | — | 42 | X |
| 6-3 | X | X | 1477 | 1.47 | 985 | — | — | 26 | X |
| 7-1 | ○ | ○ | 3087 | 5.36 | 1950 | −14.2% | −14.5% | 187 | ○ |
| 7-2 | ○ | ○ | 3278 | 5.65 | 2345 | −15.1% | −19.2% | 178 | ○ |
| 7-3 | ○ | ○ | 2723 | 5.48 | 2564 | −16.2% | −18.5% | 124 | ○ |
| 7-4 | ○ | X | 2036 | 4.89 | 2417 | −13.5% | −13.8% | 92 | X |
| 8-1 | ○ | ○ | 2555 | 5.69 | 1846 | −14.5% | −14.2% | 145 | ○ |
| 8-2 | ○ | ○ | 2632 | 5.47 | 2020 | −14.5% | −16.7% | 156 | ○ |
| 8-3 | ○ | ○ | 2985 | 5.55 | 2284 | −15.0% | −18.1% | 181 | ○ |
| 8-4 | ○ | ○ | 2635 | 5.86 | 2413 | −15.8% | −18.2% | 164 | ○ |
| 8-5 | ○ | X | 1856 | 3.65 | 1852 | −13.2% | −12.5% | 88 | X |
| 8-6 | ○ | ○ | 2684 | 5.55 | 2284 | −15.0% | −17.1% | 192 | ○ |
| 8-7 | ○ | ○ | 2578 | 5.45 | 2175 | −16.2% | −17.5% | 189 | ○ |
| 9-1 | ○ | ○ | 2425 | 4.58 | 2111 | −14.8% | −13.5% | 132 | ○ |
| 9-2 | ○ | ○ | 2622 | 4.47 | 2078 | −15.0% | −17.1% | 143 | ○ |
| 9-3 | ○ | ○ | 2261 | 4.94 | 2071 | −16.2% | −16.4% | 129 | ○ |
| 9-4 | ○ | X | 1745 | 3.37 | 1784 | −13.8% | −13.2% | 76 | X |
| 10-1 | ○ | ○ | 1958 | 3.98 | 1952 | −15.5% | −13.4% | 93 | X |
| 10-2 | ○ | X | 1846 | 4.11 | 2238 | −16.7% | −16.4% | 77 | X |

Embodiments 6-1 to 10-2 in Table 5 list embodiments according to changes in the content of the fourth and fifth subcomponents based on 100 mol of a BaTiO₃ base material having a size of 150 nm as the main component, and Table 6 lists the properties of the prototype MLCC chip corresponding to these embodiments.

When the content of the fifth subcomponent SiO₂ was low at 0.5 mol (embodiments 6-1 to 6-3), firing density was low regardless of the content of the fourth subcomponent, such that the room temperature dielectric constant and MTTF were less than the target values according to the example embodiment such that it was difficult to implement the target properties according to the example embodiment. Under the condition in which an appropriate amount of Ba was added to each SiO₂ content and the ratio of (Ba+Ca)/Si became 0.48 (embodiments 7-2, 8-3, and 9-2), as compared to the condition in which the ratio was 0 or close to 0 (embodiments 7-1, 8-1, and 9-1), the overall properties according to the example embodiment were satisfied and the effect of improving the room temperature dielectric constant may be confirmed. However, under the condition in which the ratio of (Ba+Ca)/Si became 1.88 (embodiments 7-4, 8-5, and 9-4) due to the excessive addition of SiO₂, the room temperature dielectric constant was less than 2000 or the MTTF was less than 100 hours, such that target properties according to the example embodiment were not satisfied.

Accordingly, it may be indicated in embodiments 6-1 to 9-4 that, when the ratio (Ba+Ca)/Si of the fourth and fifth subcomponents satisfies the range of 1.60 or less, the target properties according to the example embodiment may be realized. Embodiments 10-1 to 10-2 list examples according to the change of BaCO₃ content when the content of SiO₂, the fifth subcomponent, was 4.0 mol based on 100 mol of the main component or 4.0 at % in element ratio, and in this case, even when the ratio (Ba+Ca)/Si of the fourth and fifth subcomponents satisfied the range of 1.60 or less, the room temperature dielectric constant and the MTTF were lower than the target values according to the example embodiment, such that it may be difficult to implement the target properties.

Accordingly, according to the embodiments related to variations in the fourth and fifth subcomponents, when the content of the fourth subcomponent satisfies 4.8 mol or less based on 100 mol of the main component or 4.8 at % or less in element ratio, and the content of SiO₂, the fifth subcomponent, satisfies the range of 0.8 to 3.0 mol based on 100 mol of the main component or 0.8 to 3.0 at % in element ratio, and the ratio of the fourth subcomponent to the fifth subcomponent (Ba+Ca)/Si ratio satisfies the range of 1.60 or less, overall properties according to the example embodiment may be realized.

According to the aforementioned example embodiments, reliability of the multilayer electronic component may improve.

Also, the room temperature dielectric constant, DC-bias properties, and high-temperature withstand voltage properties of the multilayer electronic component may improve.

Also, the X7R or X7S capacitance temperature properties of the multilayer electronic component may be satisfied.

Also, reliability of the multilayer electronic component may improve by generating defects in the dielectric grains.

Also, the Si element may be present in a solid-solution form in a grain boundary region formed in a crystal lattice of a dielectric.

While the example embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:
a body including a dielectric layer and an internal electrode; and
an external electrode disposed on the body,
wherein the dielectric layer includes a plurality of dielectric grains,
wherein the plurality of dielectric grains include one or more first dielectric grains in which a sum of lengths of defects in one first dielectric grain is 150 nm or more, and
wherein the defects include a line defect.

2. The multilayer electronic component of claim 1, wherein the defects further include a planar defect.

3. The multilayer electronic component of claim 1, wherein the defects are dislocations.

4. The multilayer electronic component of claim 1, wherein the dielectric layer includes one or more first grain boundaries in which an Si content within 2 nm in a direction perpendicular to one first grain boundary is 3.0 at % or more in a center taken in the direction perpendicular to the one first grain boundary.

5. The multilayer electronic component of claim 4, wherein the one or more first grain boundaries has a perovskite structure.

6. The multilayer electronic component of claim 5, wherein at least a portion of the Si content includes Si that is a solute in a solid solution in the perovskite structure.

7. The multilayer electronic component of claim 4, wherein the one or more first grain boundaries is a grain boundary of the first dielectric grain.

8. The multilayer electronic component of claim 1, wherein the sum of lengths of defects in the one first dielectric grain is 150 nm or more and less than 843 nm in the one first dielectric grain.

9. The multilayer electronic component of claim 1, wherein the dielectric layer includes the one or more first dielectric grains in a 2 μm×2 μm region.

10. The multilayer electronic component of claim 9, wherein the 2 μm×2 μm region includes one or more first grain boundaries in which an Si content within 2 nm in a direction perpendicular to the one or more first grain boundaries is 3.0 at % or more in a center of the grain boundaries.

11. The multilayer electronic component of claim 1, wherein the dielectric layer is formed using a dielectric composition, and
wherein the dielectric composition includes a $BaTiO_3$-based material as a main component.

12. The multilayer electronic component of claim 11, wherein the $BaTiO_3$-based material includes one or more selected from the group consisting of $BaTiO_3$, $(Ba,Ca)(Ti,Ca)O_3$, $(Ba,Ca)(Ti,Zr)O_3$, and $Ba(Ti,Zr)O_3$.

13. The multilayer electronic component of claim 11,
wherein the dielectric composition further includes a first subcomponent including one or more of an oxide or a carbonate of a variable valence acceptor element,
wherein the variable valence acceptor element includes one or more of Mn, V, Cr, Fe, Ni Co, Cn, and Zn, and
wherein a content of the variable valence acceptor element included in the first subcomponent is 0.2 mol or more and 1.4 mol or less based on 100 mol of the main component.

14. The multilayer electronic component of claim 11,
wherein the dielectric composition further includes a second subcomponent including one or more of an oxide or a carbonate of Mg, and
wherein a content of Mg element included in the second subcomponent is 2.0 mol or less based on 100 mol of the main component.

15. The multilayer electronic component of claim 11,
wherein the dielectric composition further includes a third subcomponent including one or more of an oxide and a carbonate of a rare earth element,
wherein the rare earth element includes one or more of Y, Dy, Ho, Er, Gd, Ce, Nd, Sm, Tb, Tm, La, Gd, and Yb, and
wherein a content of the rare earth element included in the third subcomponent is 0.6 mol or more and 3.0 mol or less based on 100 mol of the main component.

16. The multilayer electronic component of claim 11,
wherein the dielectric composition further includes a fourth subcomponent including one or more of an oxide and a carbonate of one or more of Ba and Ca, and
wherein a sum of contents of one or more of Ba and Ca included in the fourth subcomponent is 4.8 mol or less based on 100 mol of the main component.

17. The multilayer electronic component of claim 11,
wherein the dielectric composition further includes a fifth subcomponent including one or more of an oxide of Si, a carbonate of Si, and a glass including Si, and
wherein a content of Si element included in the fifth subcomponent is 0.8 mol or more and 3.0 mol or less based on 100 mol of the main component.

18. The multilayer electronic component of claim 11,
wherein the dielectric composition further includes a fourth subcomponent and a fifth subcomponent, and
wherein the fourth subcomponent includes one or more of an oxide and a carbonate of one or more of Ba and Ca,
wherein the fifth subcomponent includes one or more of an oxide of Si, a carbonate of Si, and a glass including Si,
wherein a content of Si element included in the fifth subcomponent is 0.8 mol or more and 3.0 mol or less based on 100 mol of the main component, and
wherein, a sum of contents of one or more of Ba and Ca included in the fourth subcomponent is defined as 4 s, a content of Si element included in the fifth subcomponent is defined as 5 s, and 4 s/5 s is 1.60 or less.

19. The multilayer electronic component of claim 11, wherein the multilayer electronic component satisfies one or more properties among dielectric constant≥2000, HALT assessment MTTF≥100 hours at a temperature condition of 150° C. and electric field condition of 42 V/μm, RC value≥1000 ΩF, and TCC≤±22% in a temperature range of −55° C. to 125° C.

20. The multilayer electronic component of claim 19, wherein the multilayer electronic component satisfies all properties: dielectric constant≥2000, HALT assessment MTTF≥100 hours at a temperature condition of 150° C. and electric field condition of 42 V/μm, RC value≥1000 ΩF, and TCC≤±22% in a temperature range of −55° C. to 125° C.

21. A method of manufacturing the multilayer electronic component of claim 1, the method comprising:
    milling a dielectric composition including dielectric powder as a main component, a solvent, and a dispersant;
    preparing a slurry by adding a binder to the dielectric composition and conducting further milling;
    forming a ceramic green sheet using the slurry;
    forming a laminate by printing a conductive paste for the internal electrode on the ceramic green sheet and laminating;
    forming the body including the dielectric layer and the internal electrode by firing the laminate; and
    forming the external electrode on the body,
    wherein the milling of the dielectric composition is performed such that the dielectric layer includes the one or more first dielectric grains.

22. The method of claim 21, wherein the defects further include a planar defect.

23. The method of claim 21, wherein the defects are dislocations.

24. The method of claim 21, wherein the milling of the dielectric composition includes milling the dielectric composition for 4 hours or more.

25. The method of claim 21, wherein the milling of the dielectric composition includes milling the dielectric composition for 4 hours or more and less than 30 hours.

26. The method of claim 21, wherein, in the forming the body, the firing is performed in an atmosphere of EMF 760 mV or higher.

27. The method of claim 21, wherein, in the forming of the body, the firing is performed in an atmosphere of a hydrogen concentration of 0.5% or more.

28. The method of claim 21,
    wherein the forming of the body further includes a reoxidation process of performing a reoxidation heat treatment after the firing of the laminate, and
    wherein the reoxidation process is performed at a temperature lower than a firing temperature in a reducing atmosphere.

29. The method of claim 21, wherein the dielectric powder is a $BaTiO_3$-based material.

30. The method of claim 29, wherein the $BaTiO_3$-based material includes one or more selected from a group consisting of $BaTiO_3$, $(Ba,Ca)(Ti,Ca)O_3$, $(Ba,Ca)(Ti,Zr)O_3$, and $Ba(Ti,Zr)O_3$.

31. The method of claim 29,
    wherein the dielectric composition further includes a first subcomponent including one or more of an oxide or a carbonate of a variable valence acceptor element,
    wherein the variable valence acceptor element includes one or more of Mn, V, Cr, Fe, Ni Co, Cn, and Zn, and
    wherein a content of the variable valence acceptor element included in the first subcomponent is 0.2 mol or more and 1.4 mol or less based on 100 mol of the main component.

32. The method of claim 29,
    wherein the dielectric composition further includes a second subcomponent including one or more of an oxide or a carbonate of Mg, and
    wherein a content of Mg element included in the second subcomponent is 2.0 mol or less based on 100 mol of the main component.

33. The method of claim 29,
    wherein the dielectric composition further includes a third subcomponent including one or more of an oxide and a carbonate of a rare earth element,
    wherein the rare earth element includes one or more of Y, Dy, Ho, Er, Gd, Ce, Nd, Sm, Tb, Tm, La, Gd, and Yb, and
    wherein a content of the rare earth element included in the third subcomponent is 0.6 mol or more and 3.0 mol or less based on 100 mol of the main component.

34. The method of claim 29,
    wherein the dielectric composition further includes a fourth subcomponent including one or more of an oxide and a carbonate of one or more of Ba and Ca, and
    wherein a sum of contents of one or more of Ba and Ca included in the fourth subcomponent is 4.8 mol or less based on 100 mol of the main component.

35. The method of claim 29,
    wherein the dielectric composition further includes a fifth subcomponent including one or more of an oxide of Si, a carbonate of Si, and a glass including Si, and
    wherein a content of Si element included in the fifth subcomponent is 0.8 mol or more and 3.0 mol or less based on 100 mol of the main component.

36. The method of claim 29,
    wherein the dielectric composition further includes a fourth subcomponent and a fifth subcomponent,
    wherein the fourth subcomponent includes one or more of an oxide and a carbonate of one or more of Ba and Ca,
    wherein the fifth subcomponent includes one or more of an oxide of Si, a carbonate of Si, and a glass including Si,
    wherein a content of Si element included in the fifth subcomponent is 0.8 mol or more and 3.0 mol or less based on 100 mol of the main component, and wherein, a sum of contents of one or more of Ba and Ca included in the fourth subcomponent is defined as 4 s, a content of the Si element included in the fifth subcomponent is defined as 5 s, and 4 s/5 s is 1.60 or less.

37. The method of claim 21, wherein the multilayer electronic component satisfies one or more properties among dielectric constant≥2000, HALT assessment MTTF≥100 hours at a temperature condition of 150° C. and electric field condition of 42 V/μm, RC value≥1000 ΩF, and TCC≤±22% in a temperature range of −55° C. to 125° C.

38. The method of claim 21, wherein the multilayer electronic component satisfies all properties: dielectric constant≥2000, HALT assessment MTTF≥100 hours at a temperature condition of 150° C. and electric field condition of 42 V/μm, RC value≥1000 ΩF, and TCC≤±22% in a temperature range of −55° C. to 125° C.

39. The method of claim 21, wherein an average diameter size of the dielectric powder is 50 nm or more and 300 nm or less.

40. The multilayer electronic component of claim 1, wherein the defects extend from a grain boundary toward the center of the one first dielectric grain.

* * * * *